US009025428B2

(12) United States Patent
Jones, IV et al.

(10) Patent No.: US 9,025,428 B2
(45) Date of Patent: May 5, 2015

(54) ALLOCATING AND RECEIVING TONES FOR A FRAME

(75) Inventors: Vincent Knowles Jones, IV, Redwood City, CA (US); Didier Johannes Richard Van Nee, De Meern (NL); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 623 days.

(21) Appl. No.: 13/085,964

(22) Filed: Apr. 13, 2011

(65) Prior Publication Data

US 2011/0255620 A1    Oct. 20, 2011

Related U.S. Application Data

(60) Provisional application No. 61/323,976, filed on Apr. 14, 2010.

(51) Int. Cl.
*H04J 11/00* (2006.01)
*H04L 5/00* (2006.01)

(52) U.S. Cl.
CPC .................................... *H04L 5/0046* (2013.01)

(58) Field of Classification Search
None
See application file for complete search history.

(56) References Cited

U.S. PATENT DOCUMENTS

| 8,395,997 | B2 * | 3/2013 | Banerjea et al. ............ 370/241 |
| 2010/0046656 | A1 | 2/2010 | Van Nee et al. |
| 2010/0260159 | A1 | 10/2010 | Zhang et al. |
| 2011/0026623 | A1 | 2/2011 | Srinivasa et al. |

FOREIGN PATENT DOCUMENTS

WO    WO-2010021900    2/2010

OTHER PUBLICATIONS

Draft Standard for Information Technology Telecommunications and information exchange between systems. Local and metropolitan area networks Specific requirements Part 11: Wireless LAN Medium Access Control (MAC) and Physical Layer (PHY) specifications Amendment 5 Enhancements for Higher Throughput IEEE P802.11N/D9.0, Mar. 1, 2009, pp. 1,2,276-297, XP002606795. IEEE P802.11 n/D9.0 Retrieved from the Internet: URL:http://ieeexplore.ieee.org/stamp/stamp.jsp"tp=&arnumber=4810960 [retrieved on Oct. 25, 2010] p. 278 p. 292 p. 29.

International Search Report and Written Opinion—PCT/US2011/032425, ISA/EPO—Aug. 3, 2011.

(Continued)

*Primary Examiner* — Gregory Sefcheck
*Assistant Examiner* — Daniel Mitchell
(74) *Attorney, Agent, or Firm* — Eric Ho

(57) ABSTRACT

A communication device for allocating tones is described that includes a processor and instructions in memory in electronic communication with the processor. The communication device determines whether a bandwidth for signal transmission is 20, 40, 80 or 160 megahertz (MHz). The communication device respectively allocates tones for 20, 40, 80 or 160 MHz as follows: for a very high throughput (VHT) signal A1 (VHT-SIG-A1): 52, 104, 208, 416; a VHT signal A2 (VHT-SIG-A2): 52, 104, 208, 416; a VHT short training field (VHT-STF): 12, 24, 48, 48; one or more VHT long training field(s) (VHT-LTF(s)): 56, 114, 242, 484; a VHT signal B (VHT-SIG-B): 56, 114, 242, 484; and a data field (DATA): 56, 114, 242, 484. The communication device also transmits the signal.

44 Claims, 11 Drawing Sheets

(56) References Cited

OTHER PUBLICATIONS

Lanante L, et al., "IEEE802.11ac Preamble with Legacy 802.11a/n Backward Compatibility", IEEE 802.11-YY/0847R0, [Online] Jul. 14, 2009, pp. 1-18, XP002606794, Retrieved from the Internet: URL:http://www.google.de/url"sa=t&source=web&cd=3 &ved=0CBgQFjAC&url=https%3A%2F%2Fmentor.ieee. org%2F802.11%2Fdcnc%2F10%2F11-10-0791-02-00ac-pha se-ro-tation-for-the-80-mhz-802-11ac-mixed-mode-packet.ppt &ei=u3bFT07TE8qh4QbZko26Aw &usg=AFQjCNHYIiVI8HNnsZmesHd33saVGqWpOw> [retrieved on Oct. 25, 2010] pp. 3-12.

Robert Stacey, "Multi-band, multi-radio wireless LANs and PANs", Signals, Systems and Computers, 2009 Conference Record of the Forty-Third Asilomar Conference on, IEEE, Piscataway, NJ, USA, Nov. 1, 2009, pp. 317-320, XP031679607, ISBN: 978-1-4244-5825-7.

Sean Coffey, Adrian Stephens: "IEEE P802.11 Wireless LANs. Joint Proposal: High throughput extension to the 802.11 Standard: PHY" IEEE, Piscataway, NJ, USA 0RD—0000-00-00, Jan. 10, 2006, pp. 1-32, XP040385527 pp. 8,12,13.

Syafei W., et al., "A Gigabit MIMO WLAN system with international standardization strategy," Ntelligent Signal Processing and Communication Systems, 2009, 228-231.

Zhang H et al., "802.11ac Preamble", IEEE 802.11-10/0070R0, [Online] Jan. 18, 2010, pp. 1-11, XP002610760, Retrieved from the Internet: URL:https://mentor.ieee.org/802.11/dcn/10/11-10-0359-00-00ac-802-11ac-preambie.ppt> [retrieved on Nov. 22, 2010].

Imashioya R., et al., "RTL Design of 1.2Gbps MIMO WLAN System and its Business Aspect", Communications and Information Technology. 2009. ISCIT 2009. 9th International Symposium on, IEEE, Piscataway, NJ, USA, Sep. 28, 2009, pp. 296-301, XP031571317, ISBN: 978-1-4244-4521-9.

Stacey R, "Proposed TGac Draft Amendment ; 11-10-1361-03-00ac-proposed-tgac-draft-amendment", IEEE SA Mentor; 11-10-1361-03-00AC-Proposed-TGAC-draftamendment, IEEE-SA Mentor, Piscataway, NJ USA, vol. 802.11 ac, No. 3, Jan. 19, 2011, pp. 1-154, XP068035312.

* cited by examiner

US 9,025,428 B2

ALLOCATING AND RECEIVING TONES FOR A FRAME

RELATED APPLICATIONS

This application is related to and claims priority from U.S. Provisional Patent Application Ser. No. 61/323,976, filed Apr. 14, 2010, entitled "TONE NUMEROLOGY FOR 802.11ac PREAMBLE", and is incorporated herein by reference in its entirety.

TECHNICAL FIELD

The present disclosure relates generally to communication systems. More specifically, the present disclosure relates to allocating and receiving tones for a frame.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.).

Use of communication devices has dramatically increased over the past few years. Communication devices often provide access to a network, such as a Local Area Network (LAN) or the Internet, for example. Other communication devices (e.g., access terminals, laptop computers, smart phones, media players, gaming devices, etc.) may wirelessly communicate with communication devices that provide network access. Some communication devices comply with certain industry standards, such as the Institute of Electrical and Electronics Engineers (IEEE) 802.11 (e.g., Wireless Fidelity or "Wi-Fi") standards. Communication device users, for example, often connect to wireless networks using such communication devices.

As the use of communication devices has increased, advancements in communication device capacity, reliability and efficiency are being sought. Systems and methods that improve communication device capacity, reliability and/or efficiency may be beneficial.

SUMMARY

A communication device for allocating orthogonal frequency division multiplexing (OFDM) tones is disclosed. The communication device includes a processor and instructions stored in memory that is in electronic communication with the processor. The communication device determines whether a bandwidth for signal transmission is 20 megahertz (MHz), 40 MHz, 80 MHz or 160 MHz. The communication device also allocates 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz. The communication device additionally allocates 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz. The communication device further allocates 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz. The communication device also allocates 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz. The communication device additionally transmits the signal.

The communication device may allocate 12 tones for a non-high throughput (non-HT) short training field (L-STF), 52 tones for a non-HT long training field (L-LTF) and 52 tones for a non-HT signal field (L-SIG) if the bandwidth is 20 MHz. The communication device may also allocate 24 tones for the L-STF, 104 tones for the L-LTF and 104 tones for the L-SIG if the bandwidth is 40 MHz. The communication device may additionally allocate 48 tones for the L-STF, 208 tones for the L-LTF and 208 tones for the L-SIG if the bandwidth is 80 MHz. The communication device may further allocate 48 tones for the L-STF, 416 tones for the L-LTF and 416 tones for the L-SIG if the bandwidth is 160 MHz.

The VHT-SIG-B may carry 26 bits if the bandwidth is 20 MHz. The VHT-SIG-B may carry 27 bits per 20 MHz of bandwidth if the bandwidth is 40 MHz. The VHT-SIG-B may carry 29 bits per 20 MHz of bandwidth if the bandwidth is 80 MHz. The VHT-SIG-B may carry 29 bits per 20 MHz of bandwidth if the bandwidth is 160 MHz. The VHT-SIG-B may carry one or more pad bits if the bandwidth is 80 MHz or 160 MHz.

The communication device may generate a bandwidth message based on the bandwidth. The communication device may modulate the VHT-SIG-A2 using quadrature binary phase-shift keying (QBPSK) to indicate that a frame includes a very high throughput (VHT) signal. The communication device may insert pilot tones at subcarrier indices −103, −75, −39, −11, 11, 39, 75 and 103 if the bandwidth is 80 MHz.

A communication device for receiving orthogonal frequency division multiplexing (OFDM) tones is also disclosed. The communication device includes a processor and instructions stored in memory that is in electronic communication with the processor. The communication device determines whether a bandwidth for signal reception is 20 megahertz (MHz), 40 MHz, 80 MHz or 160 MHz. The communication device also receives 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz. The communication device additionally receives 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz. The communication device further receives 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz. The communication device also receives 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz. Determining whether the bandwidth for signal reception is 20 MHz, 40 MHz, 80 MHz or 160 MHz may include receiving a bandwidth indication.

The communication device may receive 12 tones for a non-high throughput (non-HT) short training field (L-STF), 52 tones for a non-HT long training field (L-LTF) and 52 tones for a non-HT signal field (L-SIG) if the bandwidth is 20 MHz. The communication device may receive 24 tones for the L-STF, 104 tones for the L-LTF and 104 tones for the L-SIG if the bandwidth is 40 MHz. The communication device may receive 48 tones for the L-STF, 208 tones for the L-LTF and 208 tones for the L-SIG if the bandwidth is 80 MHz. The communication device may receive 48 tones for the L-STF, 416 tones for the L-LTF and 416 tones for the L-SIG if the bandwidth is 160 MHz.

The VHT-SIG-B may carry 26 bits if the bandwidth is 20 MHz. The VHT-SIG-B may carry 27 bits per 20 MHz of bandwidth if the bandwidth is 40 MHz. The VHT-SIG-B may carry 29 bits per 20 MHz of bandwidth if the bandwidth is 80 MHz. The VHT-SIG-B may carry 29 bits per 20 MHz of bandwidth if the bandwidth is 160 MHz. The VHT-SIG-B may carry one or more pad bits if the bandwidth is 80 MHz or 160 MHz.

The communication device may detect a very high throughput (VHT) signal if the VHT-SIG-A2 uses quadrature binary phase-shift keying (QBPSK). The communication device may receive pilot tones at subcarrier indices −103, −75, −39, −11, 11, 39, 75 and 103 if the bandwidth is 80 MHz.

A method for allocating orthogonal frequency division multiplexing (OFDM) tones on a communication device is also disclosed. The method includes determining whether a bandwidth for signal transmission is 20 megahertz (MHz), 40 MHz, 80 MHz or 160 MHz. The method also includes allocating 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz. The method additionally includes allocating 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz. The method further includes allocating 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz. The method also includes allocating 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz. The method additionally includes transmitting the signal.

A method for receiving orthogonal frequency division multiplexing (OFDM) tones on a communication device is also disclosed. The method includes determining whether a bandwidth for signal reception is 20 megahertz (MHz), 40 MHz, 80 MHz or 160 MHz. The method also includes receiving 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz. The method additionally includes receiving 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz. The method further includes receiving 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz. The method also includes receiving 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz.

A computer-program product for allocating orthogonal frequency division multiplexing (OFDM) tones is also disclosed. The computer-program product includes a non-transitory tangible computer-readable medium with instructions thereon. The instructions include code for causing a communication device to determine whether a bandwidth for signal transmission is 20 megahertz (MHz), 40 MHz, 80 MHz or 160 MHz. The instructions also include code for causing the communication device to allocate 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz. The instructions additionally include code for causing the communication device to allocate 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz. The instructions further include code for causing the communication device to allocate 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz. The instructions also include code for causing the communication device to allocate 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz. The instructions additionally include code for causing the communication device to transmit the signal.

A computer-program product for receiving orthogonal frequency division multiplexing (OFDM) tones is also disclosed. The computer-program product includes a non-transitory tangible computer-readable medium with instructions. The instructions include code for causing a communication device to determine whether a bandwidth for signal reception is 20 megahertz (MHz), 40 MHz, 80 MHz or 160 MHz. The instructions also include code for causing the communication device to receive 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz. The instructions additionally include code for causing the communication device to receive 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz. The instructions further include code for causing the communication device to receive 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz. The instructions also include code for causing the communication device to receive 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz.

An apparatus for allocating orthogonal frequency division multiplexing (OFDM) tones is also disclosed. The apparatus includes means for determining whether a bandwidth for signal transmission is 20 megahertz (MHz), 40 MHz, 80 MHz or 160 MHz. The apparatus also includes means for allocating 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz. The apparatus additionally includes means for allocating 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz. The apparatus further includes means for allocating 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz. The apparatus also includes means for allocating 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz. The apparatus additionally includes means for transmitting the signal.

An apparatus for receiving orthogonal frequency division multiplexing (OFDM) tones is also disclosed. The apparatus includes means for determining whether a bandwidth for signal reception is 20 megahertz (MHz), 40 MHz, 80 MHz or 160 MHz. The apparatus also includes means for receiving 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz. The apparatus additionally includes means for receiving 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz. The apparatus further includes means for receiving 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz. The apparatus additionally includes means for receiving 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz.

DETAILED DESCRIPTION

Figure 1:
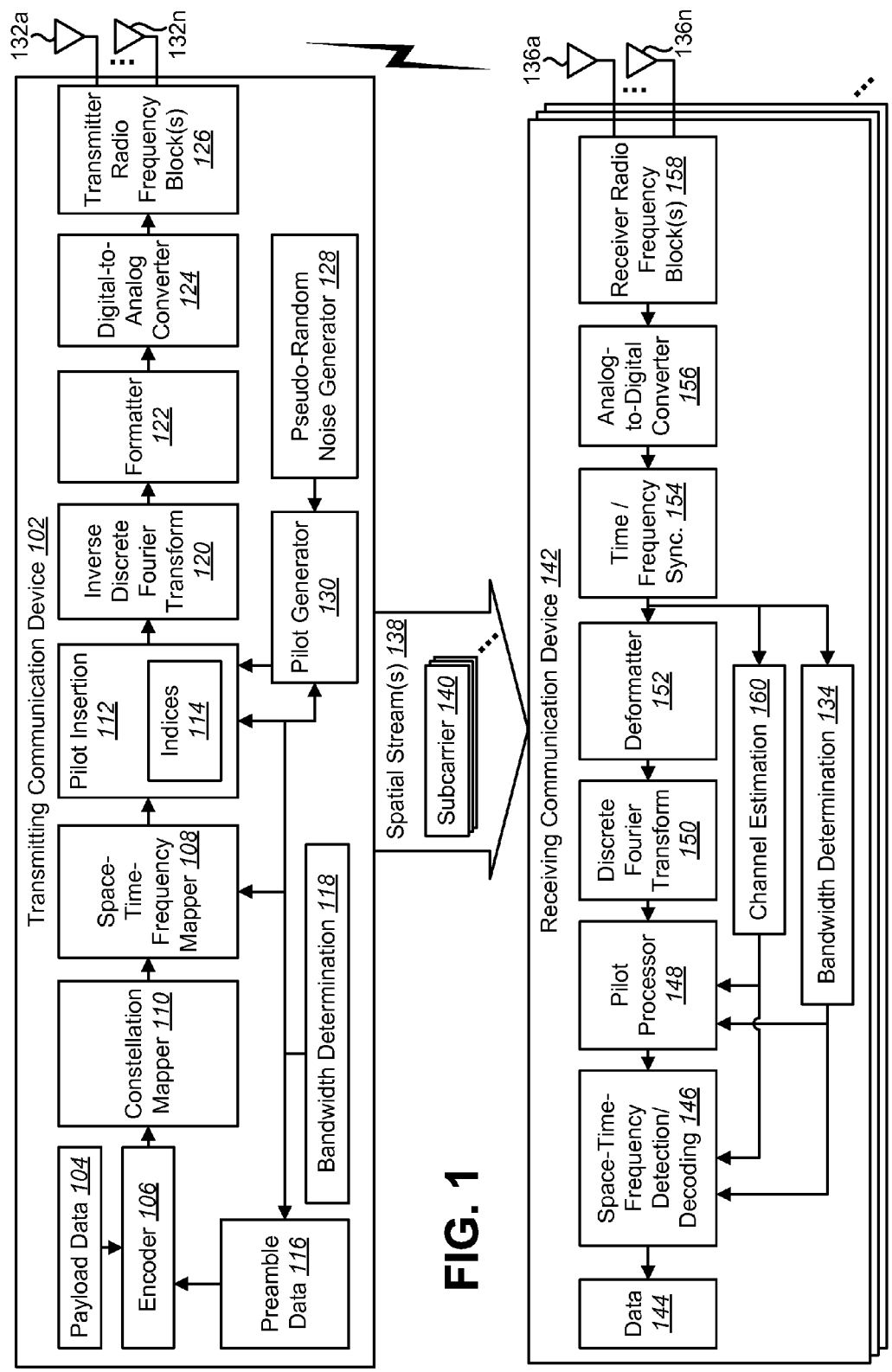
FIG. 1 is a block diagram illustrating one configuration of a transmitting communication device in which systems and methods for allocating tones for a frame may be implemented and one configuration of a receiving communication device in which systems and methods for receiving tones for a frame may be implemented.

Examples of communication devices include cellular telephone base stations or nodes, access points, wireless gateways and wireless routers. A communication device may operate in accordance with certain industry standards, such as the Institute of Electrical and Electronics Engineers (IEEE) 802.11a, 802.11b, 802.11g, 802.11n and/or 802.11ac (e.g., Wireless Fidelity or "Wi-Fi") standards. Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE) and others (e.g., where a communication device may be referred to as a NodeB, evolved NodeB (eNB), etc.). While some of the systems and methods disclosed herein may be described in terms of one or more standards, this should not limit the scope of the disclosure, as the systems and methods may be applicable to many systems and/or standards.

Some communication devices (e.g., access terminals, client devices, client stations, etc.) may wirelessly communicate with other communication devices. Some communication devices may be referred to as mobile devices, mobile stations, subscriber stations, user equipments (UEs), remote stations, access terminals, mobile terminals, terminals, user terminals, subscriber units, etc. Additional examples of communication devices include laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment (UE), remote terminal, access point, base station, Node B, evolved Node B (eNB), etc.).

Some communication devices may be capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc.

The IEEE 802.11 group's current work involves standardizing a new and faster version of 802.11, under the name VHT (Very High Throughput). This extension may be referred to as 802.11ac. Technologies are being considered that allow for multiple transmissions to occur in parallel without causing a collision, such as Spatial Division Multiple Access (SDMA). The use of additional signal bandwidth (BW) is also being considered such as transmissions using 80 megahertz (MHz) and 160 MHz. New physical-layer (PHY) preambles may be defined according to the systems and methods herein that allow for both increased signal bandwidth and SDMA and that allow backward compatibility to 802.11n, 802.11a, and 802.11. In order for the VHT preamble to be backward compatible, it may utilize an Orthogonal Frequency Division Multiplexing (OFDM) numerology that can be demodulated by legacy devices. However, it may also use an OFDM numerology that provides for increased functionality for 802.11ac devices. This numerology may include (1) a number of data tones for each OFDM symbol in the preamble, (2) a number of data tones for an OFDM data symbol, (3) a number of pilot tones, and (4) a number of direct current (DC) zero carriers. The systems and methods disclosed herein describe an OFDM sub-carrier numerology that can be applied to such a VHT extension.

An 802.11ac frame with a preamble may be structured including several fields. In one configuration, an 802.11ac frame may include a legacy short training field or non-high throughput short training field (L-STF), a legacy long training field or non-high throughput long training field (L-LTF), a legacy signal field or non-high throughput signal field (L-SIG), a very high throughput signal field A1 (VHT-SIG-A1), a very high throughput signal field A2 (VHT-SIG-A2), a very high throughput short training field (VHT-STF), one or more very high throughput long training fields (VHT-LTFs), a very high throughput signal field B (VHT-SIG-B) and a data field (e.g., DATA or VHT-DATA).

The 802.11ac preamble is designed to accommodate transmit-beamforming and SDMA. The first part of the preamble may be transmitted in an omni-directional fashion (using cyclic diversity or another scheme, for example). This part of the preamble may include the L-STF, L-LTF, L-SIG, VHT-SIG-A1, and VHT-SIG-A2. It should be noted that the L-STF, L-LTF and the L-SIG may be decodable by legacy devices (e.g., devices that comply with legacy or earlier specifications). However, the VHT-SIG-A1 and VHT-SIG-A2 (in addition to the foregoing fields, for example) may be decodable by 802.11ac devices.

The second part of the 802.11ac preamble may be transmitted in an omni-directional fashion, may be beam-formed or may be SDMA precoded. This second part of the preamble includes the VHT-STF, one or more VHT-LTFs, and the VHT-SIG-B. The data symbols (in the data field, for example) may be transmitted with the same antenna pattern as the second part of the preamble. The data symbols and the second part of the preamble may not be decodable by legacy or even all 802.11ac devices.

The 802.11ac preamble described above has some control data that is decodable by legacy 802.11a and 802.11n receivers. This data is contained in the L-SIG. The data in L-SIG informs all receivers how long the transmission will occupy the wireless medium, so that all devices can defer their transmissions for an accurate amount of time. In addition, the 802.11ac preamble allows 802.11ac devices to distinguish the transmission as an 802.11ac transmission (and avoid determining that the transmission used an 11a or 11n format). Furthermore, the 802.11ac preamble described according to the systems and methods herein may cause legacy 11a and 11n devices to detect the transmission as an 802.11a transmission, which is a valid transmission with valid data in the L-SIG.

In accordance with the systems and methods disclosed herein, a number of data and pilot tones for an 80 MHz 802.11ac signal may be defined. This may be compared to the number of data and pilot tones for 20 MHz 802.11n and 40 MHz 802.11n signals. A 20 MHz 802.11n signal uses 56 tones (52 data, four pilots) with one direct current (DC) tone. A 40 MHz 802.11n signal uses 114 tones (108 data, six pilots) with three DC tones. The systems and methods disclosed herein describe the use of 242 tones (234 data, eight pilots) with three DC tones for an 80 MHz 802.11ac signal. Using 234 data tones in accordance with the systems and methods herein may be motivated by elegant frequency interleaver constructs, reasonable cost filtering requirements and efficiency considerations. It may also be noted that an 802.11a signal uses 52 tones (48 data tones and four pilot tones) with one DC tone.

The 802.11ac preamble described in accordance with the systems and methods herein may comprise two parts or portions. A first portion may be transmitted omnidirectionally and a second portion may be transmitted with beamforming or SDMA precoding. The first three fields of the first or omnidirectional portion may contain signals (e.g., L-STF, L-LTF, L-SIG) that are decodable by 802.11a and 802.11n receivers. Furthermore, legacy 802.11a and 802.11n devices may determine that the 802.11ac transmission is an 802.11a transmission, so that these devices decode the L-SIG as if it were an 802.11a transmission.

The systems and methods disclosed herein may provide an appropriate number of tones for each field or signal that satisfy the constraints described. This tone allocation is illustrated in Table (1). More specifically, Table (1) illustrates numbers of OFDM tones that may be utilized for an 802.11ac transmission for various signal bandwidths.

TABLE (1)

| Field | Signal Bandwidth | | | |
| --- | --- | --- | --- | --- |
| | 20 MHz | 40 MHz | 80 MHz | 160 MHz |
| L-STF | 12 | 24 | 48 | 48 |
| L-LTF | 52 | 104 | 208 | 416 |
| L-SIG | 52 | 104 | 208 | 416 |
| VHT-SIG-A1 | 52 | 104 | 208 | 416 |
| VHT-SIG-A2 | 52 | 104 | 208 | 416 |
| VHT-STF | 12 | 24 | 48 | 48 |
| VHT-LTFs | 56 | 114 | 242 | 484 |
| VHT-SIG-B | 56 | 114 | 242 | 484 |
| DATA | 56 | 114 | 242 | 484 |

The L-STF may use 12 tones per 20 MHz signal. In this case, the time-domain signal has a repetition interval of 800 nanoseconds (ns). This repetition interval may be used for fast gain control, timing offset estimation and frequency offset estimation. The received signal strength may be quickly measured because the time-domain signal only needs to be considered for one 800 ns interval. Legacy 802.11a and 802.11n devices will expect 12 tones.

The L-LTF and L-SIG may use 52 tones for a 20 MHz signal. This may be as is expected for an 802.11a transmission by any legacy 802.11a or 802.11n device. When a 40 MHz 802.11ac signal is transmitted, the contents of these fields may be copied (and scaled by a complex number) to each 20 MHz sub-band of the 40 MHz signal. That is, L-SIG may be used in two 20 MHz sub-bands with the DC tones exactly separated by 20 MHz. Therefore, the total number of tones exactly doubles. For 80 MHz and 160 MHz, the same design may be followed, with the field scaled and copied to each of the four or eight 20 MHz sub-bands.

The L-SIG may use 48 data tones and four pilots according to 802.11a specifications. For 40 MHz, 80 MHz and 160 MHz 802.11ac transmissions, the 24 bits of data carried by the L-SIG (using binary phase-shift keying (BPSK) and 1/2 rate coding, for example) may be transmitted in each of the 20 MHz sub-bands. This allows any legacy device, which is only receiving on a single 20 MHz channel, to decode the data in the L-SIG and defer appropriately.

The VHT-SIG-A1 and VHT-SIG-A2 fields or symbols may use 52 tones (48 data tones and four pilot tones) in 20 MHz. The number of data tones may be the same as L-SIG, because the channel estimate (which is based on L-LTF) can only be accomplished for these data tones. For 40 MHz, 80 MHz and 160 MHz bandwidths, the number of data tones and pilot tones follow the L-LTF for the same reason.

The VHT-STF may use 12 tones per 20 MHz signal as with the L-STF. In this way, a receive gain control algorithm can quickly measure receive signal strength using only an 800 ns period. If more tones are used, the receiver may need to wait for a longer time period for accurate signal strength measurement, thereby putting constraints on the time allocated for the analog receive gains to change and settle to their new values. Gain control may be required because the received signal strength may be different for the second part of the preamble (and the DATA field) as compared to the first part of the preamble. Additionally, an update to the timing and frequency offset may be accomplished using the VHT-STF.

The VHT-LTF, VHT-SIG-B and DATA fields may utilize more OFDM tones than the first or omnidirectional portion of the preamble. Therefore, each of these fields may utilize the same number of tones as the DATA. For 20 MHz and 40 MHz 802.11ac transmissions, the number of tones is chosen to match the 802.11n standard. For 80 MHz and 160 MHz 802.11ac transmission, the number of tones may be chosen to be 242 and 484, respectively.

For a 20 MHz 802.11ac transmission, the VHT-SIG-B field carries 26 bits of data (52 tones, if BPSK and 1/2 rate coding is used). For a 40 MHz 802.11ac transmission, the VHT-SIG-B field may carry either 54 bits of unique data or the same 27 bits of data in each 20 MHz sub-band. An 80 MHz transmission of the VHT-SIG-B field may carry 29 bits of data in each 20 MHz sub-band or 58 bits of data in each 40 MHz sub-band or 117 bits of data. A similar selection may be made for a 160 MHz transmission. It should be noted that although BPSK and 1/2 rate coding is used as an example herein, other modulation schemes and/or coding rates may be used in a accordance with the systems and methods herein, which may allow for different numbers of bits to be included in each symbol. Table (2) illustrates one example of a number of data tones and a number of bits per signal bandwidth that may be used in accordance with the systems and methods disclosed herein.

TABLE (2)

| VHT-SIG-B | Signal Bandwidth | | | |
| --- | --- | --- | --- | --- |
| | 20 MHz | 40 MHz | 80 MHz | 160 MHz |
| Number of Tones | 56 | 114 | 242 | 484 |
| Number of Data Tones | 52 | 108 | 234 | 468 |
| Number of Bits per 20 MHz Bandwidth | 26 | 27 | 29 + 1 pad | 29 + 2 pad |

Extra bits for wider bandwidth signals could be used to signal additional capabilities that are possible when more than 20 MHz of signal bandwidth is employed. For example, an 80 MHz signal may be composed of four independent 20 MHz signals (streams), where each 20 MHz signal could carry a different encoded stream of data. Each of these streams may have different modulation and coding (e.g., use a different modulation and coding scheme (MCS)). Each stream may additionally have a different number of bytes. Furthermore, each stream may have different amounts of packet aggregation, such as an 802.11n-type aggregated media access control (MAC) protocol data unit (A-MPDU) or aggregated physical layer convergence procedure (PLCP) protocol data unit (PPDU), where each PPDU carries its own VHT-SIG-B field, for example. All of these characteristics may be signaled and indicated by the VHT-SIG-B field bits carried in that respective 20 MHz stream.

More details regarding one configuration in which the systems and methods disclosed herein may be applied are given hereafter. In this configuration, several operational numbers are specified. It should be noted that different operational numbers may be used in different configurations. In this example, a maximum number of transmit (Tx) antennas sounded is eight. This may provide reasonable complexity, cost, and preamble length trade-off. A maximum number of spatial streams ($N_{SS}$) in a single-user (SU) case may be eight. Given that eight transmit antennas may be sounded, there is inherent support for up to eight spatial streams.

In a multi-user case, the maximum number of spatial streams ($N_{SS}$) per user (e.g., access point, client, station, wireless communication device, etc.) is four in this example. Given that multiple users may share spatial streams, it is natural to make this number smaller than eight. This also fits very high throughput signal field (VHT-SIG) size limitations and reduces the number of representation bits required. The maximum number of spatial streams ($N_{SS}$) summed over users in the multi-user case is eight in this example. Given that eight transmit antennas may be sounded, there is inherent support for up to eight spatial streams.

A maximum number of multi-user users may be four. A larger number may significantly increase media access control (MAC) and/or physical (PHY) layer complexity. This fits VHT-SIG size limitations and reduces the number of representation bits required.

Having the maximum number of transmit antennas sounded as eight meets project authorization request (PAR) requirements (e.g., IEEE standards board project authorization request (PAR) requirements). For a single user case, eight antenna with $N_{SS}$=8 may allow for throughput greater than 500 megabits per second (Mbps). For a multi user case, eight-antenna sounding may allow for throughput greater than 1 gigabits per second (Gbps). Furthermore, there may be a physical limitation on access points (APs) and stations (STAs) to include more than eight antennas. Additionally, going to 16 antenna sounding increases preamble length. Furthermore, the number of bits required to indicate a number of antennas sounded also increases, even though there may be a limited number of bits available in a frame preamble.

Having the maximum number spatial streams ($N_{SS}$) as eight in the single user case meets PAR requirements. For a single user case, eight spatial streams may allow for throughput greater than 500 Mbps. It should be noted that the maximum number of spatial streams ($N_{SS}$) is less than or equal to the maximum number of antennas sounded.

Having the maximum number of spatial streams ($N_{SS}$) per user in the multiple user case as four meets PAR requirements. For multi-user transmission, two transmissions of $N_{SS}$=4 may allow throughput greater than 1 Gbps. Given that multiple users may share spatial streams, it is natural to make this number smaller than eight. This fits VHT-SIG field size limitations and reduces the number of representation bits required. For example, three bits may be required to define a number of space-time streams ($N_{STS}$) per user for multi-user transmission. For resolvable long training fields (LTFs), these bits may be included in the very high throughput signal field A (VHT-SIG-A).

Having the maximum number of spatial streams ($N_{SS}$) summed over users in the multi-user case as eight meets PAR requirements. For multi-user transmission, the sum of numbers of spatial streams ($N_{SS}$) equal to eight may lead to throughput greater than 1 Gbps. Given that eight transmit antennas may be sounded, there is inherent support for up to eight spatial streams.

Having the maximum number of multi-user users as four meets PAR requirements. For example, a multi-user transmission with four users and two streams per user may allow throughput greater than 1 Gbps. A larger number may significantly increase MAC and/or PHY layer complexity. For example, each user stream may need to be separately encrypted and modulated. However, having a maximum of four users in a multi-user case fits VHT-SIG size limitations and reduces the number of representation bits required. It should be noted that $N_{SS}$ bits may be pre-allocated for each user in the VHT-SIG-A. Even with four multi-user users, however, most of the VHT-SIG-A bits are already allocated.

One configuration of a frame preamble may include the following features. The frame preamble may provide very high throughput auto-detection using a 90-degree rotation on a second VHT-SIG field symbol (e.g., VHT-SIG-A2). This frame preamble may use modulation for the VHT-SIG field(s) that is the same as that used in 802.11a/n: binary phase-shift keying (BPSK) with 1/2 rate coding. A single frame preamble may be used, without a Greenfield format.

In this configuration, the frame preamble may include several fields: an L-STF, an L-LTF, an L-SIG field, a VHT-SIG-A field (that may include VHT-SIG-A1 and VHT-SIG-A2 fields or symbols, for example), a VHT-STF, one or more VHT-LTFs, a VHT-SIG-B field (which may include one symbol, for example) and a VHT-DATA field. The preamble may have a rate of 6 Mbps, with a length determined by a variable T. The second symbol in VHT-SIG-A (e.g., VHT-SIG-A2) may use a modulation or constellation mapping that is rotated by 90 degrees relative to the first symbol in VHT-SIG-A (e.g., VHT-SIG-A1). Thus, the VHT-SIG-A2 may be used for VHT auto-detection.

This approach to auto-detection may provide reliable spoofing of existing 802.11n receivers (as an 802.11a packet, for example), regardless of which 802.11n auto-detect algorithm was implemented in the existing 802.11n receiver. This approach also provides reliable 802.11ac auto-detection with a largest Euclidean Distance (for BPSK versus quadrature binary phase-shift keying (QBPSK), for example). It should be noted that it may be risky to manipulate modulation of the first VHT-SIG-A symbol (e.g., VHT-SIG-A1). Given various existing implementations of 802.11n auto-detections, it may not be fair to assume any particular 802.11n auto-detect approach as in other approaches. For example, making such an assumption may make it more likely that an 802.11n device false-detects a high throughput signal field (HT-SIG) and goes into an energy detection-clear channel assessment (ED-CCA) stage.

Regarding detection timing, VHT-STF automatic gain control (AGC) may be deferred by an approximate fast Fourier transform (FFT) processing time (before VHT detection). 802.11ac devices may run a faster clock to support higher throughput. Therefore, AGC computation may be faster than high throughput (HT) devices. In one configuration, part of the guard interval (GI) for the first VHT-LTF may be used for AGC computation. Much more complex functions (e.g., downlink multiuser (DL-MU) functions, a faster decoder, etc.) than AGC computation may be required for 802.11ac. Thus, VHT AGC enhancement may be trivial. Accordingly, a reliable legacy spoofing may be more important than the extra complexity of AGC enhancement.

Concerning the modulation of the VHT-SIG fields, it may be preferable to continue using the lowest possible MCS to modulate VHT-SIG fields. For example, MCS0 may be used to guarantee the longest range. This may ensure that the header is not worse than the data field.

Regarding the Greenfield (GF) format, it may be preferable not to define a second preamble format. In 802.11n, the GF format has only had limited usage so far. However, one of the arguments in favor of the GF format in 802.11n was the existence of green space in the 5 GHz range due to the limited use of 802.11a. Nevertheless, if there are no 5 GHz deployments of 802.11n, then there is no point to the 802.11ac task group (TGac). Thus, the assumption should be that there will be 5 GHz deployments of 802.11n. Similar to 802.11n, having multiple preamble types compounds the difficulty of auto-detection for a small physical layer (PHY) efficiency improvement. Thus, the PHY improvement may be offset by GF protection exchanges.

In accordance with the systems and methods disclosed herein, some preamble design goals are given hereafter. One goal is backward compatibility. For example, the preamble design may allow robust legacy 802.11a deferral and robust legacy 802.11n deferral. Another preamble design goal is reliable auto-detection among 802.11a, 802.11n (for mixed mode (MM) and GF, for example) and VHT preambles. Another goal is to have a single preamble structure in single-user (SU) and multi-user (MU) cases. Another design goal is to allow the signaling of VHT PHY information by the VHT-SIG field(s). Training for wider channels and detection and deferral in each sub-channel are further goals. Yet other preamble design goals include having a preamble with a low peak-to-average power ratio (PAPR) and minimizing or reducing overall preamble length.

In one configuration of the systems and methods disclosed herein, spoofing and auto-detection may be performed as follows. L-SIG spoofing may be used for both 802.11a and 802.11n receivers. For example, this may be done as 802.11n spoofing for 802.11a/g receivers. In one configuration, the bit rate may be 6 Mbps, where length/rate indicates duration. 90-degree rotated BPSK (QBPSK) on a VHT-SIG symbol may be used for VHT auto-detection. An 802.11n receiver will treat the packet as 802.11a packet (L-SIG spoofing).

Some additional detail on aggregation bit in VHT-SIGs for MU packets is given hereafter. There may be no need to indicate the duration of the packet in VHT-SIG again. For example, length information may be obtained from the L-SIG field. An aggregated MAC protocol data unit (A-MPDU) structure may be used to provide length information for individual MPDUs. It may be required that an A-MPDU is always used with a VHT frame. The MAC layer may provide an A-MPDU that fills the frame up to the last byte for each per-user stream, and the PHY layer provides 0-7 bits of padding. This same padding scheme may also be defined in SU packets. Thus, an "aggregation" bit may not be needed in the VHT-SIG.

In a MU case, the VHT-SIG-A field may include the "common" bits for all clients. For example, the VHT-SIG-A field may indicate the number of space-time streams ($N_{STS}$) for each user. It should be noted that prior multiuser group and user identification (ID) assignment frame exchanges may be needed before DL-MU packets are used (e.g., by sounding and/or via management frames). Thus, each user may be able to get its own $N_{STS}$ information from the VHT-SIG-A field(s).

The VHT-SIG-B field contains user-specific information (e.g., modulation and coding rate) and may be spatially multiplexed for different clients. The VHT-SIG-B field is placed after all the VHT-LTFs to enable better receiver-side interference mitigation in DL-MU before decoding the VHT-SIG-B. This requires each client getting as many LTFs as needed to train the total number of spatial streams across all users—referred to as "resolvable VHT-LTF." "Non-resolvable VHT-LTF" may be selected if all clients do not support receiver-side interference mitigation or if interference mitigation is not required.

Considerations for the VHT-SIG fields include bandwidth, short GI, group identification (ID) field, MCS, space-time block coding (STBC), sounding, smoothing, coding type, cyclic redundancy check (CRC) and tail.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a transmitting communication device 102 in which systems and methods for allocating tones for a frame may be implemented and one configuration of a receiving communication device 142 in which systems and methods for receiving tones for a frame may be implemented. The transmitting communication device 102 may include an encoder 106 with an input for receiving payload data 104 and/or preamble data 116 to be transmitted to one or more receiving communication devices 142. The payload data 104 may include voice, video, audio and/or other data. The preamble data 116 may include control information, such as information that specifies a data rate, modulation and coding scheme (MCS), channel bandwidth, etc. The encoder 106 might encode data 104, 116 for forward error correction (FEC), encryption, packeting and/or other encodings known for use with wireless transmission.

A constellation mapper 110 maps the data provided by the encoder 106 into constellations. For instance, the constellation mapper 110 may use modulation schemes such as binary phase-shift keying (BPSK), quadrature amplitude modulation (QAM), etc. Where quadrature-amplitude modulation (QAM) is used, for example, the constellation mapper 110 might provide two bits per spatial stream 138, per data subcarrier 140, per symbol period. Furthermore, the constellation mapper 110 may output a 16-QAM constellation signal for each spatial stream 138 for each data subcarrier 140 for each symbol period. Other modulations may be used, such as 64-QAM, which would result in a consumption of six bits per spatial stream 138, per data subcarrier 140, per symbol period. Other variations are also possible.

The output of the constellation mapper 110 is provided to a space-time-frequency mapper 108 that maps the data onto Spatial-Time-Frequency (STF) dimensions of the transmitter. The dimensions represent various constructs or resources that allow for data to be allocated. A given bit or set of bits (e.g., a grouping of bits, a set of bits that correspond to a constellation point, etc.) may be mapped to a particular place among the dimensions. In general, bits and/or signals mapped to different places among the dimensions are transmitted from the transmitting communication device 102 such that they are expected to be, with some probability, differentiable at one or more receiving communication devices 142. In one configuration, the space-time-frequency mapper 108 may perform space-time block coding (STBC).

One or more spatial streams 138 may be transmitted from the transmitting communication device 102 such that the transmissions on different spatial streams 138 may be differentiable at a receiver (with some probability). For example, bits mapped to one spatial dimension are transmitted as one spatial stream 138. That spatial stream 138 might be transmitted on its own antenna 132 spatially separate from other antennas 132, its own orthogonal superposition over a plurality of spatially-separated antennas 132, its own polarization, etc. Many techniques for spatial stream 138 separation (involving separating antennas 132 in space or other techniques that would allow their signals to be distinguished at a receiver, for example) are known and can be used.

In the example shown in FIG. 1, there are one or more spatial streams 138 that are transmitted using the same or a different number of antennas 132a-n (e.g., one or more). In some instances, only one spatial stream 138 might be available because of inactivation of one or more other spatial streams 138.

In the case that the transmitting communication device 102 uses a plurality of frequency subcarriers 140, there are multiple values for the frequency dimension, such that the space-time-frequency mapper 108 might map some bits to one frequency subcarrier 140 and other bits to another frequency subcarrier 140. Other frequency subcarriers 140 may be reserved as guard bands, pilot tone subcarriers, or the like that do not (or do not always) carry data 104, 116. For example, there may be one or more data subcarriers 140 and one or more pilot subcarriers 140. It should be noted that, in some instances or configurations, not all subcarriers 140 may be excited at once. For instance, some tones may not be excited to enable filtering. In one configuration, the transmitting communication device 102 may utilize orthogonal frequency-division multiplexing (OFDM) for the transmission of multiple subcarriers 140. For instance, the space-time-frequency mapper 108 may map (encoded) data 104, 116 to space, time and/or frequency resources according to the multiplexing scheme used.

The time dimension refers to symbol periods. Different bits may be allocated to different symbol periods. Where there are multiple spatial streams 138, multiple subcarriers 140 and multiple symbol periods, the transmission for one symbol period might be referred to as an "OFDM (orthogonal frequency-division multiplexing) MIMO (multiple-input, multiple-output) symbol." A transmission rate for encoded data may be determined by multiplying the number of bits per simple symbol (e.g., $\log_2$ of the number of constellations used) times the number of spatial streams 138 times the number of data subcarriers 140, divided by the length of the symbol period.

Thus, the space-time-frequency mapper 108 may map bits (or other units of input data) to one or more spatial streams 138, data subcarriers 140 and/or symbol periods. Separate spatial streams 138 may be generated and/or transmitted using separate paths. In some implementations, these paths are implemented with distinct hardware, whereas in other implementations, the path hardware is reused for more than one spatial stream 138 or the path logic is implemented in software that executes for one or more spatial streams 138. More specifically, each of the elements illustrated in the transmitting communication device 102 may be implemented as a single block/module or as multiple blocks/modules. For instance, the transmitter radio frequency block(s) 126 element may be implemented as a single block/module or as multiple parallel blocks/modules corresponding to each antenna 132a-n (e.g., each spatial stream 138). As used herein, the term "block/module" and variations thereof may indicate that a particular element or component may be implemented in hardware, software or a combination of both.

The transmitting communication device 102 may include a pilot generator block/module 130. The pilot generator block/module 130 may generate a pilot sequence. A pilot sequence may be a group of pilot symbols. In one configuration, for instance, the values in the pilot sequence may be represented by a signal with a particular phase, amplitude and/or frequency. For example, a "1" may denote a pilot symbol with a particular phase and/or amplitude, while a "−1" may denote a pilot symbol with a different (e.g., opposite or inverse) phase and/or amplitude.

The transmitting communication device 102 may include a pseudo-random noise generator 128 in some configurations. The pseudo-random noise generator 128 may generate a pseudo-random noise sequence or signal (e.g., values) used to scramble the pilot sequence. For example, the pilot sequence for successive OFDM symbols may be multiplied by successive numbers from the pseudo-random noise sequence, thereby scrambling the pilot sequence per OFDM symbol. When the pilot sequence is sent to a receiving communication device 142, the received pilot sequence may be unscrambled by a pilot processor 148.

The output(s) of the space-time-frequency mapper 108 may be spread over frequency and/or spatial dimensions. A pilot insertion block/module 112 inserts pilot tones into the pilot tone subcarriers 140. For example, the pilot sequence may be mapped to subcarriers 140 at particular indices 114. For instance, pilot symbols from the pilot sequence may be mapped to subcarriers 140 that are interspersed with data subcarriers 140 and/or other subcarriers 140. In other words, the pilot sequence or signal may be combined with the data sequence or signal. In some configurations, one or more direct current (DC) tones may be centered at index 0.

In some configurations, the combined data and pilot signal may be provided to a rotation block/module (not illustrated in FIG. 1). The rotation block/module may use a rotation or multiplication factor to rotate pilot symbols and/or data symbols. For example, the rotation block/module may rotate a VHT-SIG-A2 symbol to provide VHT auto-detection.

The transmitting communication device 102 may include a bandwidth determination block/module 118. The bandwidth determination block/module 118 may determine channel bandwidth to be used for transmissions to one or more receiving communication devices 142. This determination may be based on one or more factors, such as receiving communication device 142 compatibility, number of receiving communication devices 142 (to use the communication channel), channel quality (e.g., channel noise) and/or a received indicator, etc. In one configuration, the bandwidth determination block/module 118 may determine whether the bandwidth for signal transmission is 20 MHz, 40 MHz, 80 MHz or 160 MHz.

The bandwidth determination block/module 118 may provide an indication of the bandwidth determination to one or more blocks/modules. For example, this bandwidth indication may be provided to the space-time-frequency mapper 108, the pilot insertion block/module 112 and/or the pilot generator 130. Additionally or alternatively, the bandwidth indication may be provided as part of preamble data 116. For instance, one or more bits in the preamble data 116 may be allocated to represent the bandwidth indication. Additionally or alternatively, the bandwidth indication may be implicitly indicated in the preamble data 116. This bandwidth indication may thus be signaled to the one or more receiving communication devices 142. This may enable the one or more receiving communication devices 142 to receive preamble data 116 using the selected channel bandwidth.

The space-time-frequency mapper 108 may use the bandwidth indication to map the preamble data 116 to a number of tones (e.g., subcarriers 140). For example, the systems and methods disclosed herein may define a number of OFDM tones or subcarriers 140 that may be used by the transmitting communication device 102 for the transmission of preamble data 116 based on the channel bandwidth (as specified by the bandwidth indication, for example). The number of OFDM tones may also be specified according to a particular preamble field. For example, the space-time-frequency mapper 108 may map preamble data 116 to a number of OFDM tones based on the bandwidth determination and the preamble field as indicated in Table (1) above. For example, if the current field is a VHT-SIG-B and the bandwidth indication specifies a bandwidth of 80 MHz, the space-time-frequency mapper 108 may map preamble data 116 to 234 OFDM tones or subcarriers 140, leaving eight OFDM tones for pilots and three subcarriers 140 as DC tones. In some configurations, the space-time-frequency mapper 108 may use a look-up table to determine the number of tones or subcarriers to use for a specified bandwidth.

More specifically, if the determined bandwidth is 20 MHz, the transmitting communication device 102 may allocate 12 OFDM tones for the L-STF, 52 for the L-LTF, 52 for the L-SIG field, 52 for the VHT-SIG-A1 field or symbol, 52 for the VHT-SIG-A2 field or symbol, 12 for the VHT-STF, 56 for one or more VHT-LTFs (e.g., for each of the VHT-LTFs), 56 for the VHT-SIG-B field and/or 56 for the DATA field. If the bandwidth determined is 40 MHz, the transmitting communication device 102 may allocate 24 OFDM tones for the L-STF, 104 for the L-LTF, 104 for the L-SIG field, 104 for the VHT-SIG-A1 field or symbol, 104 for the VHT-SIG-A2 field or symbol, 24 for the VHT-STF, 114 for one or more VHT-LTFs, 114 for the VHT-SIG-B field and/or 114 for the DATA field. If the bandwidth is 80 MHz, the transmitting communication device 102 may allocate 48 OFDM tones for the L-STF, 208 for the L-LTF, 208 for the L-SIG field, 208 for the VHT-SIG-A1 field or symbol, 208 for the VHT-SIG-A2 field or symbol, 48 for the VHT-STF, 242 for one or more VHT-LTFs, 242 for the VHT-SIG-B field and/or 242 for the DATA field. If the bandwidth is 160 MHz, the transmitting communication device 102 may allocate 48 OFDM tones for the L-STF, 416 for the L-LTF, 416 for the L-SIG field, 416 for the VHT-SIG-A1 field or symbol, 416 for the VHT-SIG-A2 field or symbol, 48 for the VHT-STF, 484 for one or more VHT-LTFs, 484 for the VHT-SIG-B field or symbol and/or 484 for the DATA field.

In some configurations, the bandwidth indication may also be provided to the pilot generator 130. The pilot generator 130 may use the bandwidth indication to generate an appropriate number of pilot symbols. For example, the pilot generator 130 may generate eight pilot symbols for an 80 MHz signal (with 242 OFDM tones: 234 data tones and eight pilot tones with three DC subcarriers 140).

In some configurations, the bandwidth indication may additionally be provided to the pilot insertion block/module 112. The pilot insertion block/module 112 may use this indication to determine subcarrier indices 114 for pilot symbol insertion. For instance, an 80 MHz bandwidth may indicate that the pilot symbols should be inserted at indices −103, −75, −39, −11, 11, 39, 75 and 103.

The data and/or pilot signals are provided to an inverse discrete Fourier transform (IDFT) block/module 120. The inverse discrete Fourier transform (IDFT) block/module 120 converts the frequency signals of the data 104, 116 and inserted pilot tones into time domain signals representing the signal over the spatial streams 138 and/or time-domain samples for a symbol period. In one configuration, for example, the IDFT block/module 120 may perform a 256-point inverse fast Fourier transform (IFFT).

The time-domain signal is provided to a formatter 122. The formatter (e.g., one or more formatting blocks/modules) 122 may take the output of the inverse discrete Fourier transform (IDFT) block/module 120, convert it from parallel signals to serial (P/S), add a cyclical prefix and/or perform guard interval windowing, etc.

The formatter 122 output may be provided to a digital-to-analog converter (DAC) 124. The digital-to-analog converter (DAC) 124 may convert the formatter 122 output from one or more digital signals to one or more analog signals. The digital-to-analog converter (DAC) 124 may provide the analog signal(s) to one or more transmitter radio-frequency (TX RF) blocks 126.

The one or more transmitter radio frequency blocks 126 may be coupled to or include a power amplifier. The power amplifier may amplify the analog signal(s) for transmission. The one or more transmitter radio frequency blocks 126 may output radio-frequency (RF) signals to one or more antennas 132a-n, thereby transmitting the data 104, 116 that was input to the encoder 106 over a wireless medium suitably configured for receipt by one or more receiving communication devices 142.

One or more receiving communication devices 142 may receive and use signals from the transmitting communication device 102. For example, a receiving communication device 142 may use a received bandwidth indicator to receive a given number of OFDM tones or subcarriers 140. Additionally or alternatively, a receiving communication device 142 may use a pilot sequence generated by the transmitting communication device 102 to characterize the channel, transmitter impairments and/or receiver impairments and use that characterization to improve receipt of data 104, 116 encoded in the transmissions.

For example, a receiving communication device 142 may include one or more antennas 136a-n (which may be greater than, less than or equal to the number of transmitting communication device 102 antennas 132a-n and/or the number of spatial streams 138) that feed to one or more receiver radio-frequency (RX RF) blocks 158. The one or more receiver radio-frequency (RX RF) blocks 158 may output analog signals to one or more analog-to-digital converters (ADCs) 156. For example, a receiver radio-frequency block 158 may receive and downconvert a signal, which may be provided to an analog-to-digital converter 156. As with the transmitting communication device 102, the number of spatial streams 138 processed may or may not be equal to the number of antennas 136a-n. Furthermore, each spatial stream 138 need not be limited to one antenna 136, as various beamsteering, orthogonalization, etc. techniques may be used to arrive at a plurality of receiver streams.

The one or more analog-to-digital converters (ADCs) 156 may convert the received analog signal(s) to one or more digital signal(s). These output(s) of the one or more analog-to-digital converters (ADCs) 156 may be provided to one or more time and/or frequency synchronization blocks/modules 154. A time and/or frequency synchronization block/module 154 may (attempt to) synchronize or align the digital signal in time and/or frequency (to a receiving communication device 142 clock, for example).

The (synchronized) output of the time and/or frequency synchronization block(s)/module(s) 154 may be provided to one or more deformatters 152. For example, a deformatter 152 may receive an output of the time and/or frequency synchronization block(s)/module(s) 154, remove prefixes, etc. and/or parallelize the data for discrete Fourier transform (DFT) processing.

One or more deformatter 152 outputs may be provided to one or more discrete Fourier transform (DFT) blocks/modules 150. The discrete Fourier transform (DFT) blocks/modules 150 may convert one or more signals from the time domain to the frequency domain. A pilot processor 148 may use the frequency domain signals (per spatial stream 138, for example) to determine one or more pilot tones (over the spatial streams 138, frequency subcarriers 140 and/or groups of symbol periods, for example) sent by the transmitting communication device 102. The pilot processor 148 may additionally or alternatively de-scramble the pilot sequence. The pilot processor 148 may use the one or more pilot sequences described herein for phase and/or frequency and/or amplitude tracking. The pilot tone(s) may be provided to a space-time-frequency detection and/or decoding block/module 146, which may detect and/or decode the data over the various dimensions. The space-time-frequency detection and/or decoding block/module 146 may output received data 144 (e.g., the receiving communication device's 142 estimation of the payload data 104 and/or preamble data 116 transmitted by the transmitting communication device 102).

In some configurations, the receiving communication device 142 knows the transmit sequences sent as part of a total information sequence. The receiving communication device 142 may perform channel estimation with the aid of these known transmit sequences. To assist with pilot tone tracking, processing and/or data detection and decoding, a channel estimation block/module 160 may provide estimation signals to the pilot processor 148 and/or the space-time-frequency detection and/or decoding block/module 146 based on the output from the time and/or frequency synchronization block/module 154. Alternatively, if the de-formatting and discrete Fourier transform is the same for the known transmit sequences as for the payload data portion of the total information sequence, the estimation signals may be provided to the pilot processor 148 and/or the space-time-frequency detection and/or decoding block/module 146 based on the output from the discrete Fourier transform (DFT) blocks/modules 150.

The bandwidth determination block/module 134 may use the time/frequency synchronization block/module 154 output to determine a channel bandwidth (for received communications). For example, the bandwidth determination block/module 134 may receive a bandwidth indication from the transmitting communication device 102 that indicates a channel bandwidth. For instance, the bandwidth determination block/module 134 may obtain an explicit or implicit bandwidth indication. In one configuration, the bandwidth indication may indicate a channel bandwidth of 20 MHz, 40 MHz, 80 MHz or 160 MHz. The bandwidth determination block/module 134 may determine the bandwidth for received communications based on this indication and provide an indication of the determined bandwidth to the pilot processor 148 and/or to the space-time-frequency detection/decoding block/module 146.

More specifically, if the determined bandwidth is 20 MHz, the receiving communication device 142 may receive 12 OFDM tones for the L-STF, 52 for the L-LTF, 52 for the L-SIG field, 52 for the VHT-SIG-A1 field or symbol, 52 for the VHT-SIG-A2 field or symbol, 12 for the VHT-STF, 56 for one or more VHT-LTFs, 56 for the VHT-SIG-B field and/or 56 for the DATA field. If the bandwidth determined is 40 MHz, the receiving communication device 142 may receive 24 OFDM tones for the L-STF, 104 for the L-LTF, 104 for the L-SIG field, 104 for the VHT-SIG-A1 field or symbol, 104 for the VHT-SIG-A2 field or symbol, 24 for the VHT-STF, 114 for one or more VHT-LTFs, 114 for the VHT-SIG-B field and/or 114 for the DATA field. If the bandwidth is 80 MHz, the receiving communication device 142 may receive 48 OFDM tones for the L-STF, 208 for the L-LTF, 208 for the L-SIG field, 208 for the VHT-SIG-A1 field or symbol, 208 for the VHT-SIG-A2 field or symbol, 48 for the VHT-STF, 242 for one or more VHT-LTFs, 242 for the VHT-SIG-B field and/or 242 for the DATA field. If the bandwidth is 160 MHz, the receiving communication device 142 may receive 48 OFDM tones for the L-STF, 416 for the L-LTF, 416 for the L-SIG field, 416 for the VHT-SIG-A1 field or symbol, 416 for the VHT-SIG-A2 field or symbol, 48 for the VHT-STF, 484 for one or more VHT-LTFs, 484 for the VHT-SIG-B field or symbol and/or 484 for the DATA field.

The pilot processor 148 may use the determined bandwidth indication to extract pilot symbols from the discrete Fourier transform block/module 150 output. For example, if the determined bandwidth indication specifies that the bandwidth is 80 MHz, the pilot processor 148 may extract pilot symbols from the indices −103, −75, −39, −11, 11, 39, 75 and 103.

The space-time frequency detection/decoding block/module 146 may use the determined bandwidth indication to detect and/or decode preamble data and/or payload data from the received signal. For example, if the current field is a VHT-SIG-B field and the determined bandwidth indication specifies that the bandwidth is 80 MHz, then the space-time frequency detection/decoding block/module 146 may detect and/or decode preamble data from 234 OFDM tones or subcarriers 140 (while eight OFDM tones are pilot tones and three subcarriers 140 are used for DC tones, for instance). In some configurations, the space-time-frequency detection/decoding block/module 146 may use a look-up table to determine the number of tones or subcarriers to receive for a specified bandwidth.

Figure 2:
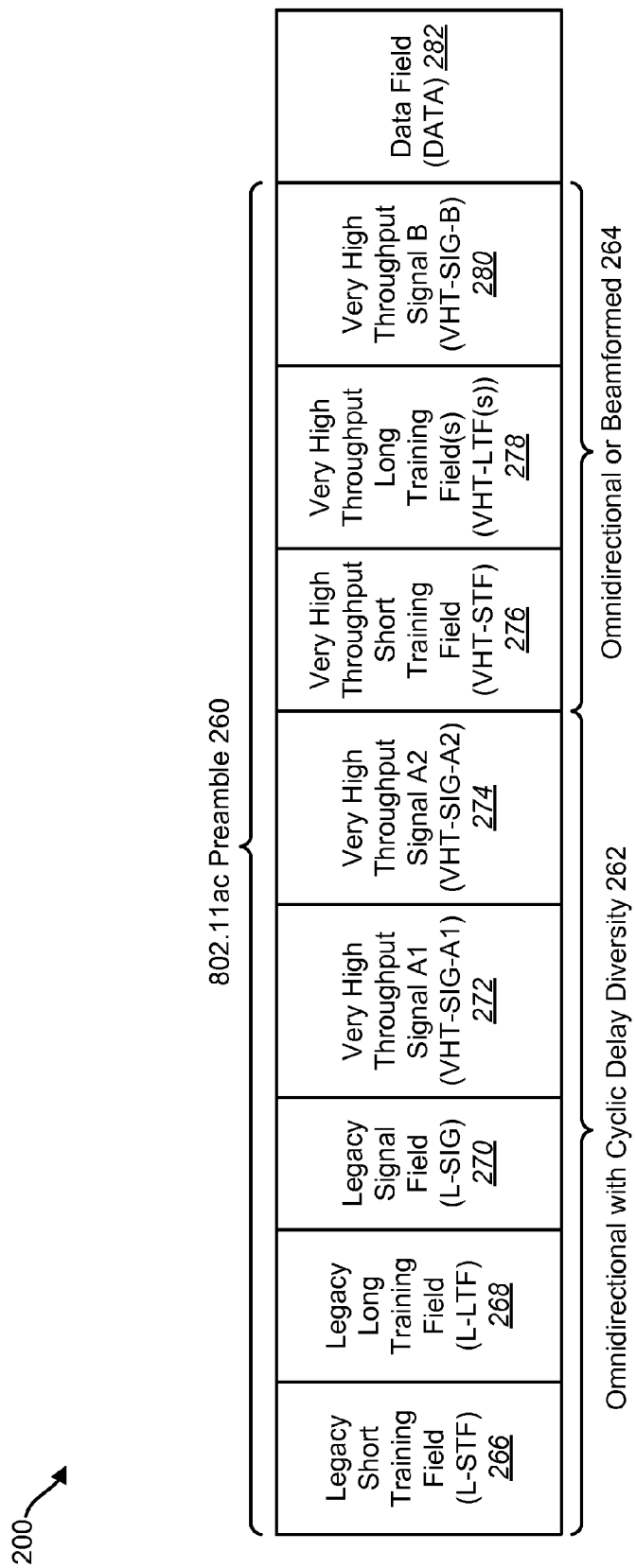
FIG. 2 is a diagram illustrating one example of a communication frame that may be used in accordance with the systems and methods disclosed herein.

FIG. 2 is a diagram illustrating one example of a communication frame 200 that may be used in accordance with the systems and methods disclosed herein. The frame 200 may include one or more sections or fields for preamble symbols, pilot symbols and/or data symbols. For example, the frame 200 may comprise an 802.11ac preamble 260 and a data field 282 (e.g., DATA or VHT-DATA field). In one configuration, the 802.11ac preamble 260 may have a duration of 40 to 68 μs. The preamble 260 and/or pilot symbols may be used (by a receiving communication device 142, for example) to synchronize, detect, demodulate and/or decode preamble 116 and/or payload data 104 included in the frame 200.

The frame 200 with an 802.11ac preamble 260 may be structured including several fields. In one configuration, an 802.11ac frame 200 may include a legacy short training field or non-high throughput short training field (L-STF) 266, a legacy long training field or non-high throughput long training field (L-LTF) 268, a legacy signal field or non-high throughput signal field (L-SIG) 270, a very high throughput signal symbol or field A1 (VHT-SIG-A1) 272, a very high throughput signal symbol or field A2 (VHT-SIG-A2) 274, a very high throughput short training field (VHT-STF) 276, one or more very high throughput long training fields (VHT-LTFs) 278, a very high throughput signal field B (VHT-SIG-B) 280 and a data field (DATA) 282.

The 802.11ac preamble 260 may accommodate transmit beamforming and SDMA. The first part or portion 262 of the preamble 260 may be transmitted in an omni-directional fashion (using cyclic diversity or another scheme, for example). This first part 262 of the preamble 260 may include the L-STF 266, L-LTF 268, L-SIG 270, VHT-SIG-A1 272, and VHT-SIG-A2 274. This first part 262 of the preamble 260 may be decodable by legacy devices (e.g., devices that comply with legacy or earlier specifications).

A second part or portion 264 of the 802.11ac preamble 260 may be transmitted in an omni-directional fashion, may be beam-formed or may be SDMA precoded. This second part 264 of the preamble 260 includes the VHT-STF 276, one or more VHT-LTFs 278, and the VHT-SIG-B 280. The data symbols (in the data field 282, for example) may be transmitted with the same antenna pattern as the second part 264 of the preamble 260. The data field 282 may also be transmitted omnidirectionally, may be beam-formed or may be SDMA precoded. The data symbols and the second part 264 of the preamble 260 may not be decodable by legacy devices (or even by all 802.11ac devices).

The 802.11ac preamble 260 may include some control data that is decodable by legacy 802.11a and 802.11n receivers. This control data is contained in the L-SIG 270. The data in the L-SIG 270 informs all receivers how long the transmission will occupy the wireless medium, so that all devices may defer their transmissions for an accurate amount of time. Additionally, the 802.11ac preamble 260 allows 802.11ac devices to distinguish the transmission as an 802.11ac transmission (and avoid determining that the transmission is in an 802.11a or 802.11n format). Furthermore, the 802.11ac preamble 260 described according to the systems and methods herein may cause legacy 802.11a and 802.11n devices to detect the transmission as an 802.11a transmission, which is a valid transmission with valid data in the L-SIG 270.

In accordance with the systems and methods disclosed herein, a number of data and pilot tones for an 80 MHz 802.11ac signal may be defined. This may be compared to the number of data and pilot tones for 20 MHz 802.11n and 40 MHz 802.11n signals. A 20 MHz 802.11n signal uses 56 tones (52 data, four pilots) with one direct current (DC) tone. A 40 MHz 802.11n signal uses 114 tones (108 data, six pilots) with three DC tones. The systems and methods disclosed herein describe the use of 242 tones (e.g., 234 data tones and eight pilot tones) with three DC tones for an 80 MHz 802.11ac signal. Using 234 data tones in accordance with the systems and methods herein may be motivated by elegant frequency interleaver constructs and reasonable cost filtering requirements. It may also be noted that an 802.11a signal uses 52 tones (48 data tones and four pilot tones) with one DC tone.

The 802.11ac preamble 260 described in accordance with the systems and methods herein may comprise two parts or portions. A first portion 262 may be transmitted omnidirectionally (with cyclic delay diversity, for example) and a second portion 264 may be transmitted omnidirectionally, with beamforming or with SDMA precoding. The first three fields (e.g., L-STF 266, L-LTF 268, L-SIG 270) of the first or omnidirectional portion 262 may contain signals that are decodable by 802.11a and 802.11n receivers. Furthermore, legacy 802.11a and 802.11n devices may determine that the 802.11ac transmission is an 802.11a transmission, such that these legacy devices decode the L-SIG 270 as if it were an 802.11a transmission.

The systems and methods disclosed herein may provide an appropriate number of tones for each preamble 260 field and/or the data field 282 that satisfy the constraints described. This tone allocation is illustrated in Table (3). More specifically, Table (3) illustrates numbers of OFDM tones that may be utilized for an 802.11ac transmission for various signal bandwidths.

TABLE (3)

| Field | Signal Bandwidth | | | |
|---|---|---|---|---|
| | 20 MHz | 40 MHz | 80 MHz | 160 MHz |
| L-STF | 12 | 24 | 48 | 48 |
| L-LTF | 52 | 104 | 208 | 416 |
| L-SIG | 52 | 104 | 208 | 416 |
| VHT-SIG-A1 | 52 | 104 | 208 | 416 |
| VHT-SIG-A2 | 52 | 104 | 208 | 416 |
| VHT-STF | 12 | 24 | 48 | 48 |
| VHT-LTFs | 56 | 114 | 242 | 484 |
| VHT-SIG-B | 56 | 114 | 242 | 484 |
| DATA | 56 | 114 | 242 | 484 |

The L-STF 266 may use 12 tones per 20 MHz signal. In this case, the time-domain signal may have a repetition interval of 800 nanoseconds (ns). This repetition interval may be used for fast gain control, timing offset estimation and frequency offset estimation. The received signal strength may be quickly measured because the time-domain signal only needs to be considered for one 800 ns interval. Legacy 802.11a and 802.11n devices will expect 12 tones.

The L-LTF 268 and L-SIG 270 may use 52 tones for a 20 MHz signal. This may be as is expected for an 802.11a transmission by any legacy 802.11a or 802.11n device. When a 40 MHz 802.11ac signal is transmitted, the contents of these fields 268, 270 may be copied (and scaled by a complex number) to each 20 MHz sub-band of the 40 MHz signal. That is, the L-SIG field 270 may be used in two 20 MHz sub-bands with the DC tones exactly separated by 20 MHz. Therefore, the total number of tones exactly doubles. For 80 MHz and 160 MHz, the same design may be followed, with the field scaled and copied to each of the four or eight 20 MHz sub-bands.

The L-SIG 270 may use 48 data tones and four pilots according to 802.11a specifications. For 40 MHz, 80 MHz and 160 MHz 802.11ac transmissions, the 24 bits of data carried by the L-SIG (using binary phase-shift keying (BPSK) and 1/2 rate coding, for example) may be transmitted in each of the 20 MHz sub-bands. This allows any legacy device, which is only receiving on a single 20 MHz channel, to decode the data in the L-SIG 270 and defer appropriately.

The VHT-SIG-A1 symbol or field 272 and VHT-SIG-A2 symbol or field 274 may use 52 tones (48 data tones and four pilot tones) in 20 MHz. The number of data tones may be the same as L-SIG 270, because the channel estimate (which is based on the L-LTF 268) may be accomplished for these data tones. For 40 MHz, 80 MHz and 160 MHz bandwidths, the number of data tones and pilot tones may follow the L-LTF 268 for the same reason.

The VHT-STF 276 may use 12 tones per 20 MHz signal as with the L-STF 266. In this way, a receive gain control algorithm can quickly measure receive signal strength using only an 800 ns period. If more tones are used, the receiver may need to wait for a longer time period for accurate signal strength measurement, thereby putting constraints on the time allocated for the analog receive gains to change and settle to their new values. Gain control may be required because the received signal strength may be different for the second part 264 of the preamble 260 (and the DATA field 282) as compared to the first part 262 of the preamble 260. Additionally, an update to the timing and frequency offset may be accomplished using the VHT-STF 276.

The one or more VHT-LTFs 278, the VHT-SIG-B field 280 and the DATA field 282 may utilize more OFDM tones than the first or omnidirectional portion 262 of the preamble 260. Therefore, each of these fields 278, 280 may utilize the same number of tones as the DATA field 282. For 20 MHz and 40 MHz 802.11ac transmissions, the number of tones may be chosen to match the 802.11n standard. For 80 MHz and 160 MHz 802.11ac transmissions, the number of tones may be chosen to be 242 and 484, respectively.

For a 20 MHz 802.11ac transmission, the VHT-SIG-B field 280 carries 26 bits of data if BPSK and 1/2 rate coding is used, for example. For a 40 MHz 802.11ac transmission, the VHT-SIG-B field 280 may carry either 54 bits of unique data or the same 27 bits of data in each 20 MHz sub-band. An 80 MHz transmission of the VHT-SIG-B field 280 may carry 29 bits of data in each 20 MHz sub-band or 58 bits of data in each 40 MHz sub-band or 117 bits of data. A similar selection may be made for a 160 MHz transmission. Thus, the VHT-SIG-B 280 may carry more information bits as the bandwidth increases from 20 MHz to 40 MHz to 80 MHz.

Extra bits for wider bandwidth signals may be used to signal additional capabilities that are possible when more than 20 MHz of signal bandwidth is employed. For example, an 80 MHz signal may be composed of four independent 20 MHz signals (streams), where each 20 MHz signal could carry a different encoded stream of data. Each of these streams may have different modulation and coding (e.g., use a different modulation and coding scheme (MCS)). Each stream may additionally have a different number of bytes. Furthermore, each stream may have different amounts of packet aggregation, such as an 802.11n-type aggregated media access control (MAC) protocol data unit (A-MPDU) or aggregated physical layer convergence procedure (PLCP) protocol data unit (PPDU), where each PPDU carries its own VHT-SIG-B field 280, for example. All of these characteristics may be signaled and indicated by the VHT-SIG-B field 280 bits carried in that respective 20 MHz stream.

Figure 3:
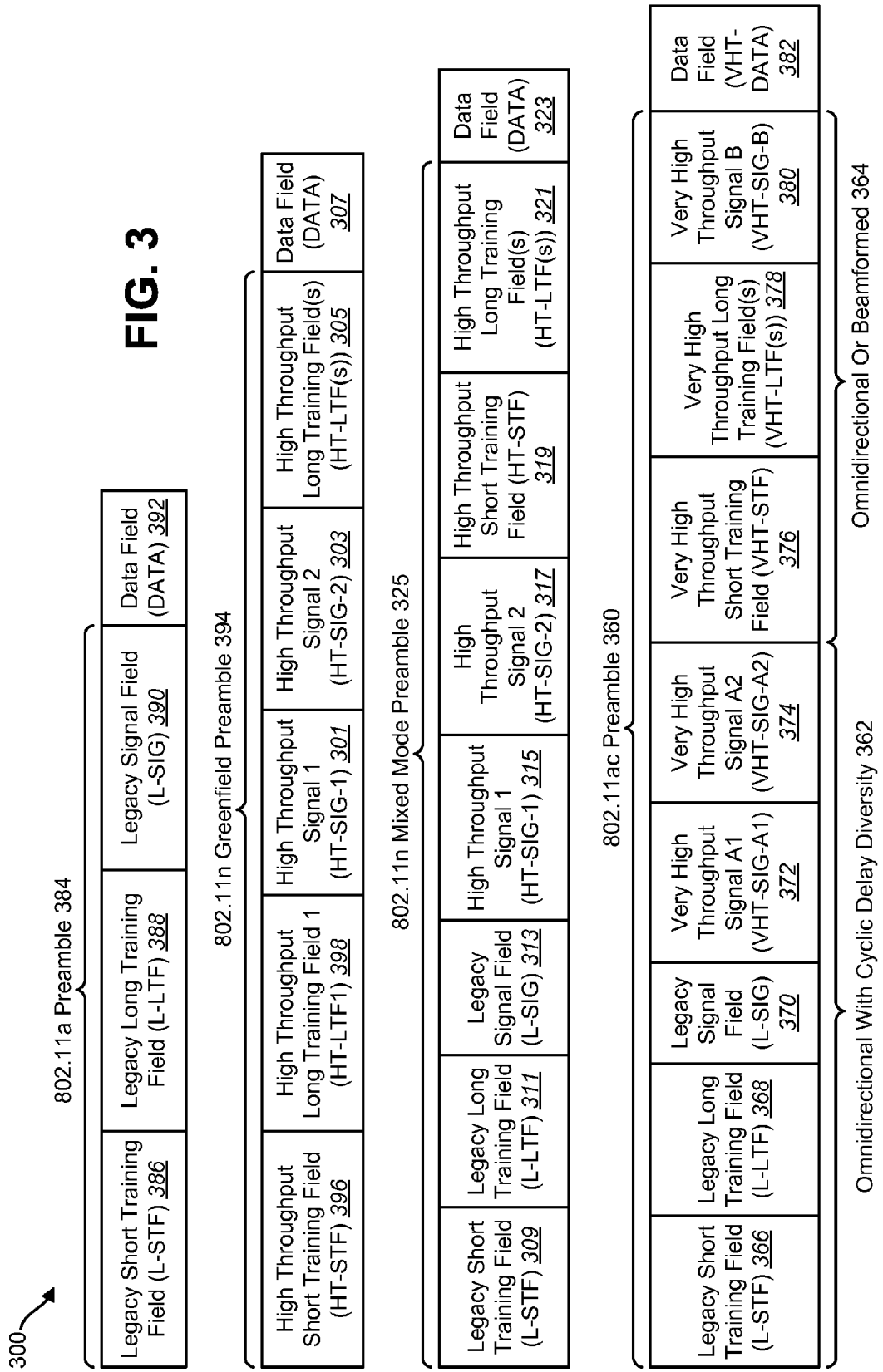
FIG. 3 is a diagram illustrating examples of several frames.

FIG. 3 is a diagram illustrating examples of several frames 300. In particular, FIG. 3 illustrates an 802.11a preamble 384, an 802.11n Greenfield (GF) preamble 394, an 802.11n mixed-mode (MM) preamble 325 and an 802.11ac preamble 360 in accordance with the systems and methods disclosed herein. More specifically, a legacy 802.11a preamble 384, a legacy 802.11n Greenfield preamble 394 and a legacy 802.11n mixed mode preamble 325 are illustrated. The 802.11a preamble 384 illustrated may have a duration of 20 μs. The 802.11n Greenfield preamble 394 illustrated may have a duration of 28 to 36 μs. The 802.11n mixed mode (MM) preamble 325 illustrated may have a duration of 36 to 48 μs. According to the systems and methods disclosed herein, the 802.11ac preamble 360 illustrated may have a duration of 40 to 68 μs.

The 802.11ac preamble 360 may accommodate transmit beamforming and SDMA. The first part or portion 362 of the preamble 360 may be transmitted in an omni-directional fashion (using cyclic diversity or another scheme, for example). This first part 362 of the preamble 360 may include the L-STF 366, L-LTF 368, L-SIG 370, VHT-SIG-A1 372, and VHT-SIG-A2 374. This first part 362 of the preamble 360 may be decodable by legacy devices (e.g., devices that comply with legacy or earlier specifications).

A second part or portion 364 of the 802.11ac preamble 360 may be transmitted in an omni-directional fashion, may be beam-formed or may be SDMA precoded. This second part 364 of the preamble 360 includes the VHT-STF 376, one or more VHT-LTFs 378, and the VHT-SIG-B 380. The data symbols (in the data field 382, for example) may be transmitted with the same antenna pattern as the second part 364 of the preamble 360. The data field 382 may also be transmitted omnidirectionally, may be beam-formed or may be SDMA precoded. The data symbols and the second part 364 of the preamble 360 may not be decodable by legacy devices (or even all 802.11ac devices).

The 802.11ac preamble 360 may include some control data that is decodable by legacy 802.11a and 802.11n receivers. This control data is contained in the L-SIG 370. The data in the L-SIG 370 informs all receivers how long the transmission will occupy the wireless medium, so that all devices may defer their transmissions for an accurate amount of time. Additionally, the 802.11ac preamble 360 allows 802.11ac devices to distinguish the transmission as an 802.11ac transmission (and avoid determining that the transmission is in an 802.11a or 802.11n format). Furthermore, the 802.11ac preamble 360 described according to the systems and methods herein may cause legacy 802.11a and 802.11n devices to believe the transmission is an 802.11a transmission, which is a valid transmission with valid data in the L-SIG 370.

The legacy 802.11a preamble 384 includes an L-STF 386, an L-LTF 388 and an L-SIG 390, which may be transmitted along with a data field 392. The 802.11n Greenfield (GF) preamble 394 includes a high throughput short training field (HT-STF) 396, a high throughput long training field 1 (HT-LTF1) 398, a high throughput signal 1 (HT-SIG-1) 301, a high throughput signal 2 (HT-SIG-2) 303 and one or more high throughput long training fields (HT-LTF(s)) 305, which may be transmitted with a data field 307. The 802.11n mixed mode (MM) preamble 325 includes an L-STF 309, an L-LTF 311 an L-SIG 313, an HT-SIG-1 315, an HT-SIG-2 317, a high throughput short training field (HT-STF) 319 and one or more HT-LTFs 321, which may be transmitted along with a data field 323. As can be observed from FIG. 3, some of the fields included in the 802.11ac preamble 360 correspond to similar fields in legacy preambles 384, 325. This may allow backwards compatibility with legacy devices when the 802.11ac preamble 360 is used.

Figure 4:
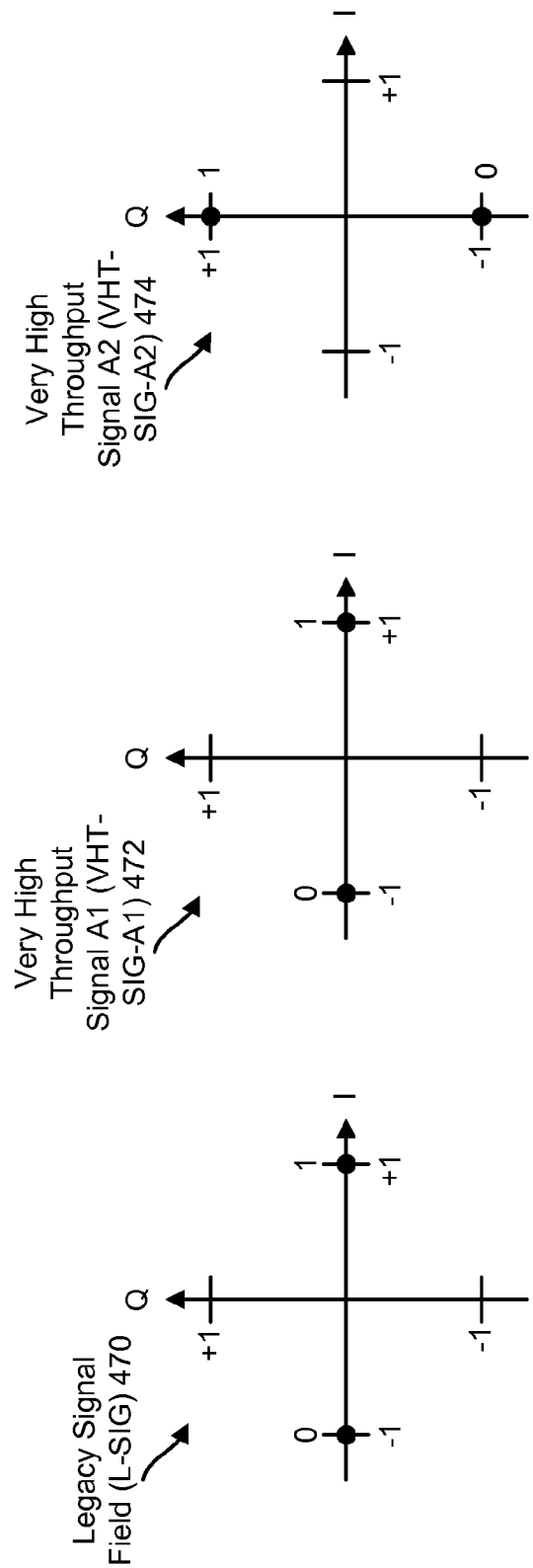
FIG. 4 is a diagram illustrating constellations for a legacy signal field (L-SIG), a very high throughput signal A1 (VHT-SIG-A1) and a very high throughput signal A2 (VHT-SIG-A2)

FIG. 4 is a diagram illustrating constellations for a legacy signal field (L-SIG) 470, a very high throughput signal A1 (VHT-SIG-A1) 472 (e.g., first symbol) and a very high throughput signal A2 (VHT-SIG-A2) 474 (e.g., second symbol). Each constellation is illustrated on an in-phase (I) axis and a quadrature (Q) axis. More specifically, FIG. 4 illustrates examples of modulation schemes that may be used for the first and second symbols in the VHT-SIG-A field and for the L-SIG field in accordance with the systems and methods disclosed herein.

A transmitting communication device 102 may use BPSK modulation with 1/2 rate coding for the L-SIG field 470 in an 802.11ac frame 200. In this scheme, a bit with a "1" value may be represented with a modulation symbol at +1 on the in-phase axis. Additionally, a bit with a "0" value may be represented with a modulation symbol at −1 on the in-phase axis.

In accordance with the systems and methods disclosed herein, a transmitting communication device 102 may use BPSK modulation with 1/2 rate coding for the VHT-SIG-A1 472 in an 802.11ac frame 200. In this scheme, a bit with a "1" value may be represented with a modulation symbol at +1 on the in-phase axis. Additionally, a bit with a "0" value may be represented with a modulation symbol at −1 on the in-phase axis.

In accordance with the systems and methods disclosed herein, a transmitting communication device 102 may use QBPSK modulation (e.g., BPSK modulation with a 90-degree rotation) with 1/2 rate coding for the VHT-SIG-A2 474 in an 802.11ac frame 200. In this scheme, a bit with a "1" value may be represented with a modulation symbol at +1 on the quadrature axis. Additionally, a bit with a "0" value may be represented with a modulation symbol at −1 on the quadrature axis.

Figure 5:
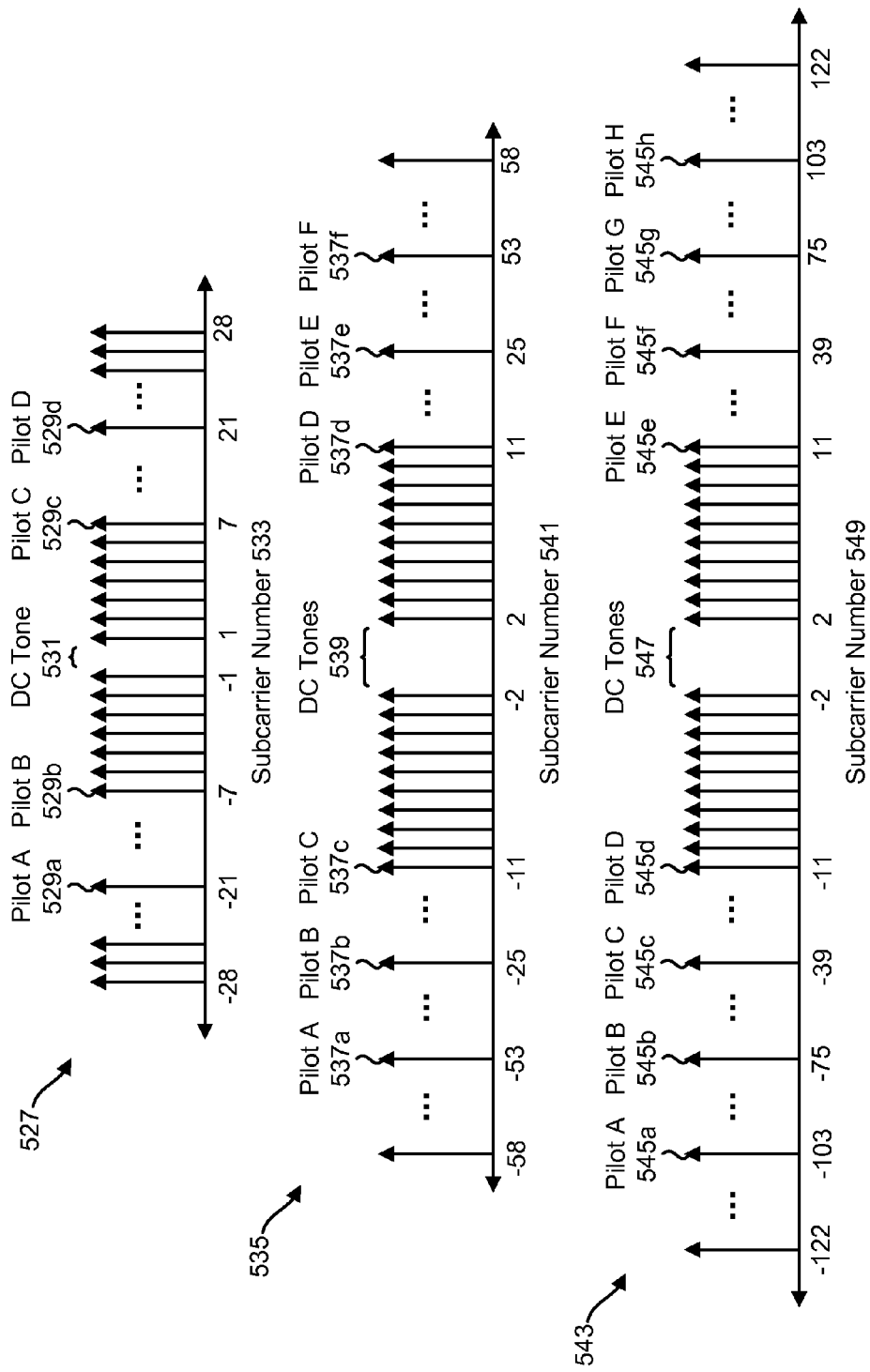
FIG. 5 is a diagram illustrating one example of data and pilot tones for an 80 MHz signal in accordance with the systems and methods disclosed herein.

FIG. 5 is a diagram illustrating one example of data and pilot tones for an 80 MHz signal 543 in accordance with the systems and methods disclosed herein. Data and pilot tones for a 20 MHz 802.11n signal 527 and data and pilot tones for a 40 MHz 802.11n signal 535 are also illustrated. In accordance with the systems and methods disclosed herein, a number of data tones and pilot tones 545a-h for an 80 MHz 802.11ac signal 543 may be defined. This may be compared to the number of data tones and pilot tones 529a-d for a 20 MHz 802.11n signal 527 and the number of data tones and pilot tones 537a-f for a 40 MHz 802.11n signal 535.

A 20 MHz 802.11n signal 527 uses 56 tones, including 52 data tones and four pilot tones 529a-d with one direct current (DC) tone 531. The data tones and pilot tones 529a-d may be located according to a subcarrier number or index 533. For example, pilot A 529a is located at −21, pilot B 529b is located at −7, pilot C 529c is located at 7 and pilot D 529d is located at 21. In this case, the single DC tone 531 is located at 0.

A 40 MHz 802.11n signal 535 uses 114 tones, including 108 data tones and six pilot tones 537a-f with three DC tones 539. The data tones and pilot tones 537a-f may be located according to a subcarrier number or index 541. For example, pilot A 537a is located at −53, pilot B 537b is located at −25, pilot C 537c is located at −11, pilot D 537d is located at 11, pilot E 537e is located at 25 and pilot F 537f is located at 53. In this case, three DC tones 539 are located at −1, 0 and 1.

The systems and methods disclosed herein describe the use of 242 tones, including 234 data tones and eight pilot tones 545a-h with three DC tones 547 for an 80 MHz 802.11ac signal 543. The data tones and pilot tones 545a-h may be located according to a subcarrier number or index 549. For example, pilot A 545a is located at −103, pilot B 545b is located at −75, pilot C 545c is located at −39, pilot D 545d is located at −11, pilot E 545e is located at 11, pilot F 545f is located at 39, pilot G 545g is located at 75 and pilot H 545h is located at 103. In this case, three DC tones 547 are located at −1, 0 and 1. Using 234 data tones in accordance with the systems and methods herein may be motivated by elegant frequency interleaver constructs and reasonable cost filtering requirements. When a transmitting communication device 102 determines a channel bandwidth of 80 MHz, for example, it 102 may allocate subcarriers 140 for data tones and pilot tones 545*a-h* according to the 802.11ac signal 543 illustrated in FIG. 5. Additionally, when a receiving communication device 142 determines a channel bandwidth of 80 MHz, for instance, it 142 may receive subcarriers 140 for data and pilot tones 545*a-h* according to the 802.11ac signal 543 illustrated in FIG. 5. It may be noted that an 802.11a signal (not shown in FIG. 5) uses 52 tones (e.g., 48 data and four pilot tones) with one DC tone.

Figure 6:
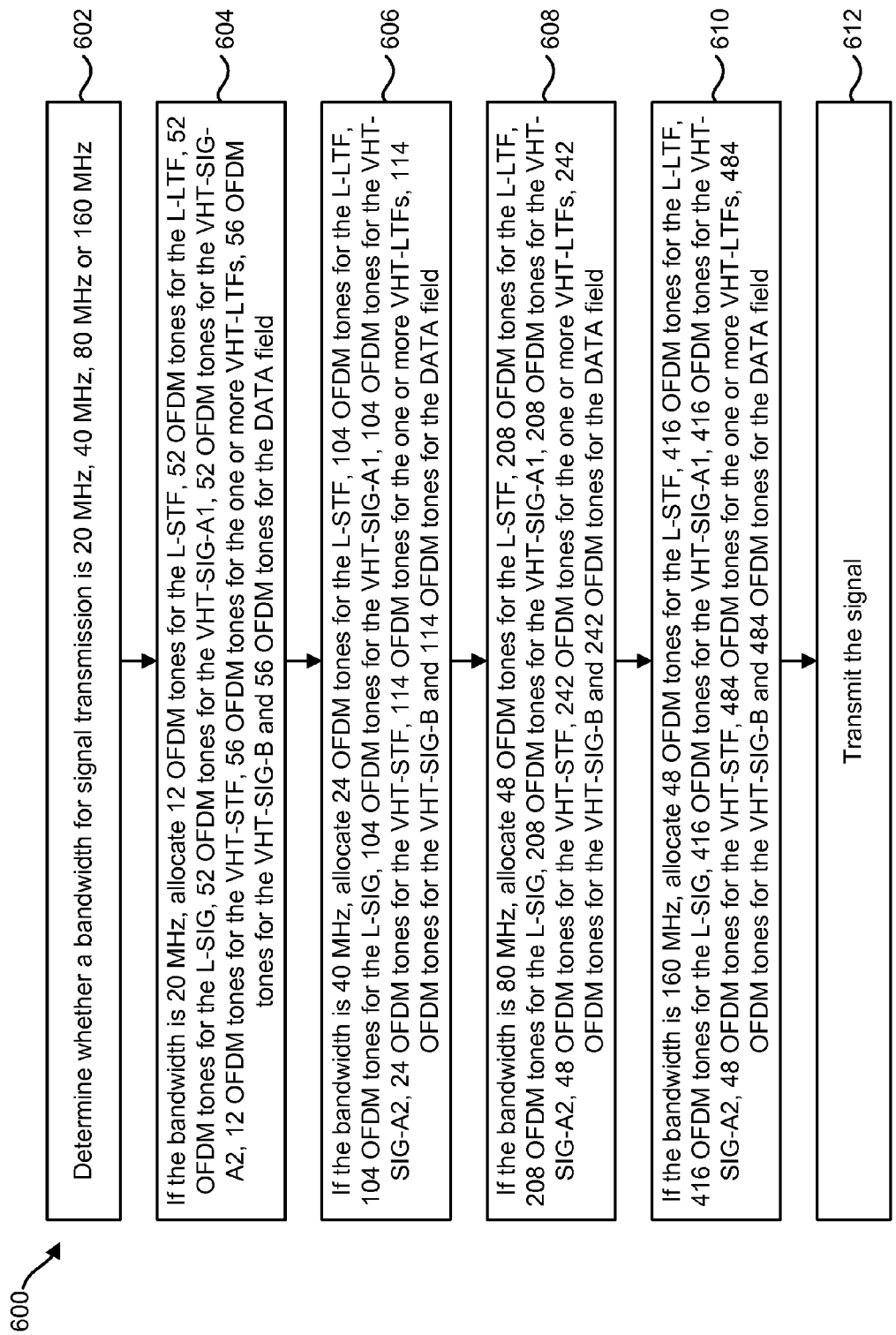
FIG. 6 is a flow diagram illustrating one configuration of a method for allocating tones for a frame.

FIG. 6 is a flow diagram illustrating one configuration of a method 600 for allocating tones for a frame. A transmitting communication device 102 may determine 602 whether a bandwidth for signal transmission is 20 MHz, 40 MHz, 80 MHz or 160 MHz. This determination 602 may be based on one or more factors, such as receiving communication device 142 compatibility, number of receiving communication devices 142 (to use the communication channel), channel quality (e.g., channel noise) and/or a received indicator, etc.

If the bandwidth determined 602 is 20 MHz, the transmitting communication device 102 may allocate 604 12 OFDM tones for the L-STF, 52 for the L-LTF, 52 for the L-SIG field, 52 for the VHT-SIG-A1 field or symbol, 52 for the VHT-SIG-A2 field or symbol, 12 for the VHT-STF, 56 for one or more VHT-LTFs, 56 for the VHT-SIG-B field and/or 56 for the DATA field. If the bandwidth determined 602 is 40 MHz, the transmitting communication device 102 may allocate 606 24 OFDM tones for the L-STF, 104 for the L-LTF, 104 for the L-SIG field, 104 for the VHT-SIG-A1 field or symbol, 104 for the VHT-SIG-A2 field or symbol, 24 for the VHT-STF, 114 for one or more VHT-LTFs, 114 for the VHT-SIG-B field and/or 114 for the DATA field.

If the bandwidth determined 602 is 80 MHz, the transmitting communication device 102 may allocate 608 48 OFDM tones for the L-STF, 208 for the L-LTF, 208 for the L-SIG field, 208 for the VHT-SIG-A1 field or symbol, 208 for the VHT-SIG-A2 field or symbol, 48 for the VHT-STF, 242 for one or more VHT-LTFs, 242 for the VHT-SIG-B field and/or 242 for the DATA field. If the bandwidth determined 602 is 160 MHz, the transmitting communication device 102 may allocate 610 48 OFDM tones for the L-STF, 416 for the L-LTF, 416 for the L-SIG field, 416 for the VHT-SIG-A1 field or symbol, 416 for the VHT-SIG-A2 field or symbol, 48 for the VHT-STF, 484 for one or more VHT-LTFs, 484 for the VHT-SIG-B field or symbol and/or 484 for the DATA field.

The transmitting communication device 102 may transmit 612 the signal. For example, the transmitting communication device 102 may perform an IDFT on the signal, format the signal, convert the signal to an analog signal and radiate the signal using one or more antennas 132*a-n*.

Figure 7:
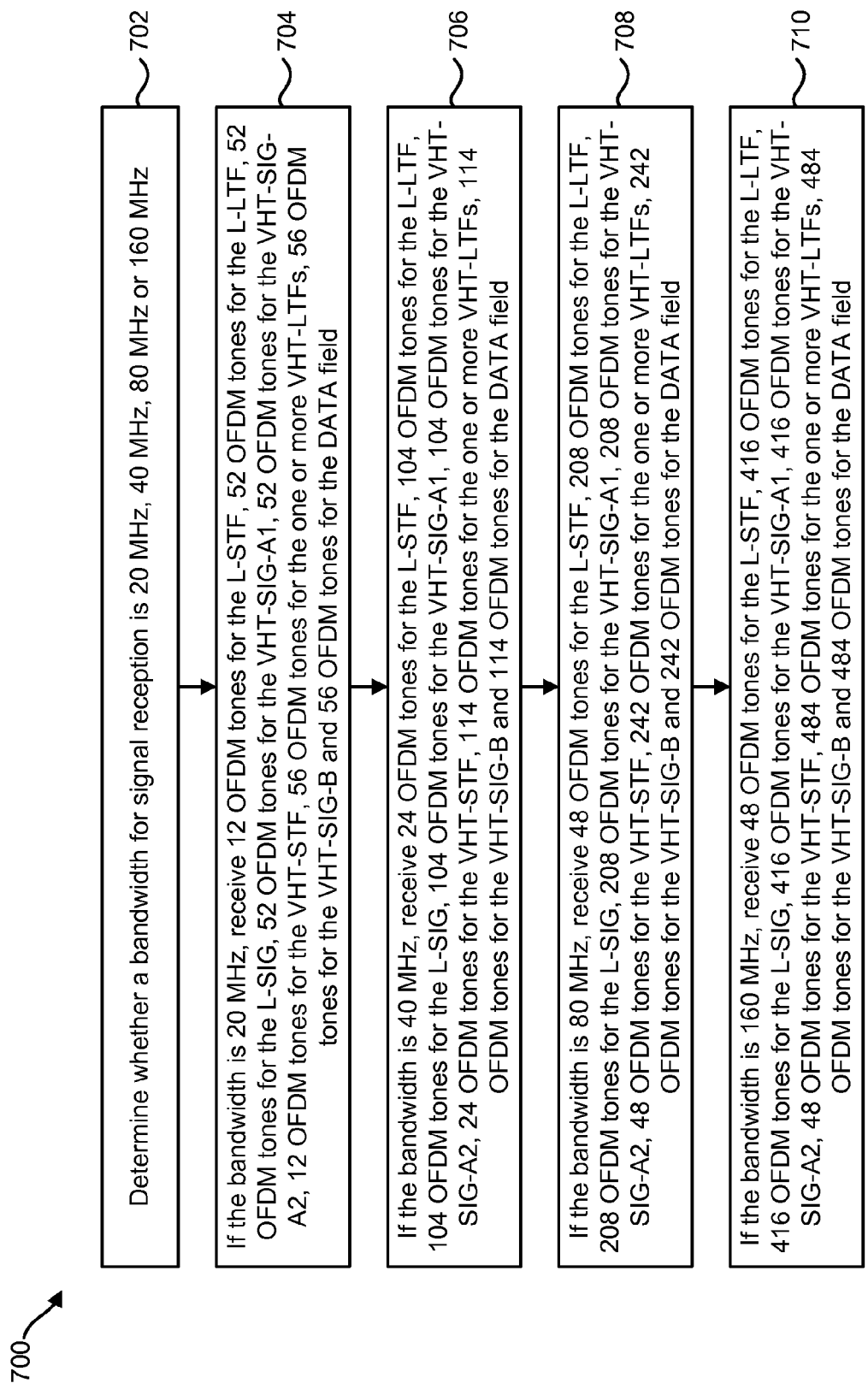
FIG. 7 is a flow diagram illustrating one configuration of a method for receiving tones for a frame.

FIG. 7 is a flow diagram illustrating one configuration of a method 700 for receiving tones for a frame. A receiving communication device 142 may determine 702 whether a bandwidth for signal reception is 20 MHz, 40 MHz, 80 MHz or 160 MHz. For example, the receiving communication device 142 may receive an indicator or message that specifies a bandwidth for signal reception. It should be noted that the indicator or message may be explicit or implicit. For instance, the indicator or message may explicitly include bits that specify a bandwidth. In another configuration, the indicator or message may be embedded with another type of data or a characteristic of the transmission, such as a choice of modulation type, information ordering, etc.

If the bandwidth determined 702 is 20 MHz, the receiving communication device 142 may receive 704 12 OFDM tones for the L-STF, 52 for the L-LTF, 52 for the L-SIG field, 52 for the VHT-SIG-A1 field or symbol, 52 for the VHT-SIG-A2 field or symbol, 12 for the VHT-STF, 56 for one or more VHT-LTFs, 56 for the VHT-SIG-B field and/or 56 for the DATA field. If the bandwidth determined 702 is 40 MHz, the receiving communication device 142 may receive 706 24 OFDM tones for the L-STF, 104 for the L-LTF, 104 for the L-SIG field, 104 for the VHT-SIG-A1 field or symbol, 104 for the VHT-SIG-A2 field or symbol, 24 for the VHT-STF, 114 for one or more VHT-LTFs, 114 for the VHT-SIG-B field and/or 114 for the DATA field.

If the bandwidth determined 702 is 80 MHz, the receiving communication device 142 may receive 708 48 OFDM tones for the L-STF, 208 for the L-LTF, 208 for the L-SIG field, 208 for the VHT-SIG-A1 field or symbol, 208 for the VHT-SIG-A2 field or symbol, 48 for the VHT-STF, 242 for one or more VHT-LTFs, 242 for the VHT-SIG-B field and/or 242 for the DATA field. If the bandwidth determined 702 is 160 MHz, the receiving communication device 142 may receive 710 48 OFDM tones for the L-STF, 416 for the L-LTF, 416 for the L-SIG field, 416 for the VHT-SIG-A1 field or symbol, 416 for the VHT-SIG-A2 field or symbol, 48 for the VHT-STF, 484 for one or more VHT-LTFs, 484 for the VHT-SIG-B field or symbol and/or 484 for the DATA field.

Figure 8:
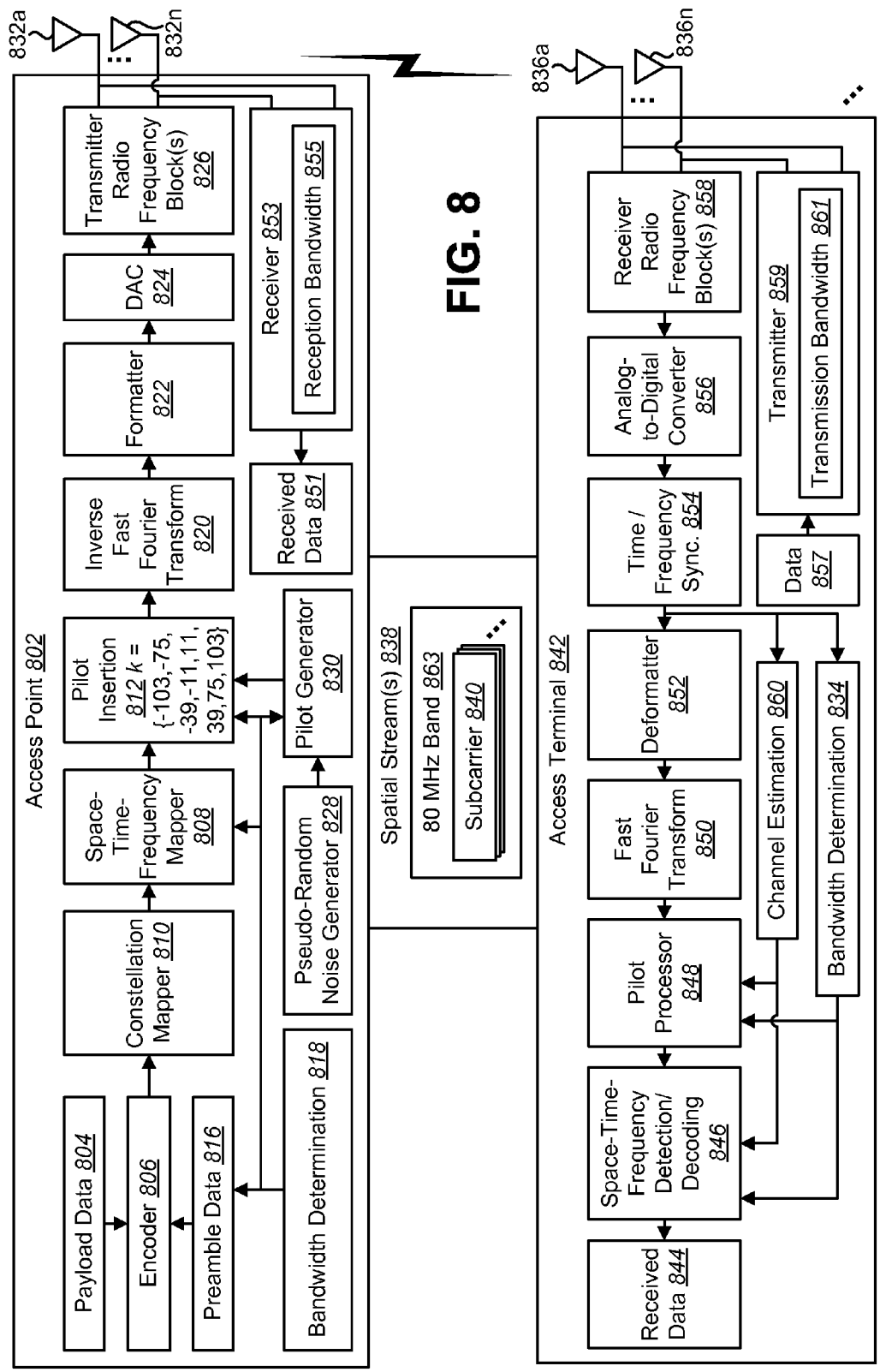
FIG. 8 is a block diagram illustrating one configuration of an access point in which systems and methods for allocating tones for a frame may be implemented.

FIG. 8 is a block diagram illustrating one configuration of an access point 802 in which systems and methods for allocating tones for a frame may be implemented. The access point 802 may include an encoder 806 with an input for receiving payload data 804 and/or preamble data 816 to be transmitted to one or more access terminals 842. The payload data 804 may include voice, video, audio and/or other data. The preamble data 816 may include control information, such as information that specifies a data rate, modulation and coding scheme (MCS), channel bandwidth, etc. The encoder 806 might encode data 804, 816 for forward error correction (FEC), encryption, packeting and/or other encodings known for use with wireless transmission. For example, the encoder 806 may encode the data 804, 816 using convolutional or low-density parity check (LDPC) coding.

A constellation mapper 810 maps the data provided by the encoder 806 into constellations. For instance, the constellation mapper 810 may use modulation schemes such as binary phase-shift keying (BPSK), quadrature amplitude modulation (QAM), etc. Where quadrature-amplitude modulation (QAM) is used, for example, the constellation mapper 810 might provide two bits per spatial stream 838, per data subcarrier 840, per symbol period. Furthermore, the constellation mapper 810 may output a 16-QAM constellation signal for each spatial stream 838 for each data subcarrier 840 for each symbol period. Other modulations may be used, such as 64-QAM, which would result in a consumption of six bits per spatial stream 838, per data subcarrier 840, per symbol period. Other variations are also possible.

The output of the constellation mapper 810 is provided to a space-time-frequency mapper 808 that maps the data onto Spatial-Time-Frequency (STF) dimensions of the transmitter. The dimensions represent various constructs or resources that allow for data to be allocated. A given bit or set of bits (e.g., a grouping of bits, a set of bits that correspond to a constellation point, etc.) may be mapped to a particular place among the dimensions. In general, bits and/or signals mapped to different places among the dimensions are transmitted from the access point 802 such that they are expected to be, with some probability, differentiable at one or more access terminals 842. In one configuration, the space-time-frequency mapper 808 may perform space-time block coding (STBC).

One or more spatial streams 838 may be transmitted from the access point 802 such that the transmissions on different spatial streams 838 may be differentiable at a receiver (with some probability). For example, bits mapped to one spatial dimension are transmitted as one spatial stream 838. That spatial stream 838 might be transmitted on its own antenna 832 spatially separate from other antennas 832, its own orthogonal superposition over a plurality of spatially-separated antennas 832, its own polarization, etc. Many techniques for spatial stream 838 separation (involving separating antennas 832 in space or other techniques that would allow their signals to be distinguished at a receiver, for example) are known and can be used.

In the example shown in FIG. 8, there are one or more spatial streams 838 that are transmitted using the same or a different number of antennas 832*a*-*n* (e.g., one or more). In some instances, only one spatial stream 838 might be available because of inactivation of one or more other spatial streams 838.

In the case that the access point 802 uses a plurality of frequency subcarriers 840, there are multiple values for the frequency dimension, such that the space-time-frequency mapper 808 might map some bits to one frequency subcarrier 840 and other bits to another frequency subcarrier 840. Other frequency subcarriers 840 may be reserved as guard bands, pilot tone subcarriers, or the like that do not (or do not always) carry data 804, 816. For example, there may be one or more data subcarriers 840 and one or more pilot subcarriers 840. It should be noted that, in some instances or configurations, not all subcarriers 840 may be excited at once. For instance, some tones may not be excited (e.g., DC tones) to enable filtering. In one configuration, the access point 802 may utilize orthogonal frequency-division multiplexing (OFDM) for the transmission of multiple subcarriers 840. For instance, the space-time-frequency mapper 808 may map (encoded) data 804, 816 to space, time and/or frequency resources according to the multiplexing scheme used.

The time dimension refers to symbol periods. Different bits may be allocated to different symbol periods. Where there are multiple spatial streams 838, multiple subcarriers 840 and multiple symbol periods, the transmission for one symbol period might be referred to as an "OFDM (orthogonal frequency-division multiplexing) MIMO (multiple-input, multiple-output) symbol." A transmission rate for encoded data may be determined by multiplying the number of bits per simple symbol (e.g., $\log_2$ of the number of constellations used) times the number of spatial streams 838 times the number of data subcarriers 840, divided by the length of the symbol period.

Thus, the space-time-frequency mapper 808 may map bits (or other units of input data) to one or more spatial streams 838, data subcarriers 840 and/or symbol periods. Separate spatial streams 838 may be generated and/or transmitted using separate paths. In some implementations, these paths are implemented with distinct hardware, whereas in other implementations, the path hardware is reused for more than one spatial stream 838 or the path logic is implemented in software that executes for one or more spatial streams 838. More specifically, each of the elements illustrated in the access point 802 may be implemented as a single block/module or as multiple blocks/modules. For instance, the transmitter radio frequency block(s) 826 element may be implemented as a single block/module or as multiple parallel blocks/modules corresponding to each antenna 832*a*-*n* (e.g., each spatial stream 838). As used herein, the term "block/module" and variations thereof may indicate that a particular element or component may be implemented in hardware, software or a combination of both.

The access point 802 may include a pilot generator block/module 830. The pilot generator block/module 830 may generate a pilot sequence. A pilot sequence may be a group of pilot symbols. In one configuration, for instance, the values in the pilot sequence may be represented by a signal with a particular phase, amplitude and/or frequency. For example, a "1" may denote a pilot symbol with a particular phase and/or amplitude, while a "−1" may denote a pilot symbol with a different (e.g., opposite or inverse) phase and/or amplitude.

The access point 802 may include a pseudo-random noise generator 828 in some configurations. The pseudo-random noise generator 828 may generate a pseudo-random noise sequence or signal (e.g., values) used to scramble the pilot sequence. For example, the pilot sequence for successive OFDM symbols may be multiplied by successive numbers from the pseudo-random noise sequence, thereby scrambling the pilot sequence per OFDM symbol. When the pilot sequence is sent to an access terminal 842, the received pilot sequence may be unscrambled by a pilot processor 848.

The output(s) of the space-time-frequency mapper 808 may be spread over frequency and/or spatial dimensions. A pilot insertion block/module 812 inserts pilot tones into the pilot tone subcarriers 840. For example, the pilot sequence may be mapped to subcarriers 840 at particular indices. For instance, pilot symbols from the pilot sequence may be mapped to subcarriers 840 that are interspersed with data subcarriers 840 and/or other subcarriers 840. In other words, the pilot sequence or signal may be combined with the data sequence or signal. In one example, if an 80 MHz band 863 is used for transmission, the pilot tones or subcarriers 840 may be located at indices k={−103, −75, −39, −11, 11, 39, 75, 103}. In some configurations, one or more direct current (DC) tones may be centered at index 0.

In some configurations, the combined data and pilot signal may be provided to a rotation block/module (not illustrated in FIG. 8). The rotation block/module may use a rotation or multiplication factor to rotate pilot symbols and/or data symbols. For example, the rotation block/module may rotate a VHT-SIG-A2 symbol by 90 degrees related to a VHT-SIG-A1 to provide VHT auto-detection.

The access point 802 may include a bandwidth determination block/module 818. The bandwidth determination block/module 818 may determine channel bandwidth to be used for transmissions to one or more access terminals 842. This determination may be based on one or more factors, such as access terminal 842 compatibility, number of access terminals 842 (to use the communication channel), channel quality (e.g., channel noise) and/or a received indicator, etc. In one configuration, the bandwidth determination block/module 818 may determine whether the bandwidth for signal transmission is 20 MHz, 40 MHz, 80 MHz or 160 MHz. In one example, the bandwidth determination block/module 818 may determine that an 80 MHz band 863 will be used for transmissions.

The bandwidth determination block/module 818 may provide an indication of the bandwidth determination to one or more blocks/modules. For example, this bandwidth indication may be provided to the space-time-frequency mapper 808, the pilot insertion block/module 812 and/or the pilot generator 830. Additionally or alternatively, the bandwidth indication may be provided as part of preamble data 816. For instance, one or more bits in the preamble data 816 may be allocated to represent the bandwidth indication. Additionally or alternatively, the bandwidth indication may be implicitly indicated in the preamble data 816. This bandwidth indication may thus be signaled to the one or more access terminals 842. This may enable the one or more access terminals 842 to receive preamble data 816 using the selected channel bandwidth.

The space-time-frequency mapper 808 may use the bandwidth indication to map the preamble data 816 to a number of tones (e.g., subcarriers 840). For example, the systems and methods disclosed herein may define a number of OFDM tones or subcarriers 840 that may be used by the access point 802 for the transmission of preamble data 816 based on the channel bandwidth (as specified by the bandwidth indication, for example). The number of OFDM tones may also be specified according to a particular preamble field. For example, the space-time-frequency mapper 808 may map preamble data 816 to a number of OFDM tones based on the bandwidth determination and the preamble field as indicated in Table (1) above. For example, if the current field is a VHT-SIG-B and the bandwidth indication specifies an 80 MHz bandwidth 863, the space-time-frequency mapper 808 may map preamble data 816 to 234 OFDM tones or subcarriers 840, leaving eight OFDM tones for pilots and three subcarriers 840 as DC tones. In some configurations, the space-time-frequency mapper 808 may use a look-up table to determine the number of tones or subcarriers to use for a specified bandwidth.

More specifically, if the determined bandwidth is 20 MHz, the access point 802 may allocate 12 OFDM tones for the L-STF, 52 for the L-LTF, 52 for the L-SIG field, 52 for the VHT-SIG-A1 field or symbol, 52 for the VHT-SIG-A2 field or symbol, 12 for the VHT-STF, 56 for one or more VHT-LTFs, 56 for the VHT-SIG-B field and/or 56 for the DATA field. If the bandwidth determined is 40 MHz, the access point 802 may allocate 24 OFDM tones for the L-STF, 104 for the L-LTF, 104 for the L-SIG field, 104 for the VHT-SIG-A1 field or symbol, 104 for the VHT-SIG-A2 field or symbol, 24 for the VHT-STF, 114 for one or more VHT-LTFs, 114 for the VHT-SIG-B field and/or 114 for the DATA field. If the bandwidth is 80 MHz, the access point 802 may allocate 48 OFDM tones for the L-STF, 208 for the L-LTF, 208 for the L-SIG field, 208 for the VHT-SIG-A1 field or symbol, 208 for the VHT-SIG-A2 field or symbol, 48 for the VHT-STF, 242 for one or more VHT-LTFs, 242 for the VHT-SIG-B field and/or 242 for the DATA field. If the bandwidth is 160 MHz, the access point 802 may allocate 48 OFDM tones for the L-STF, 416 for the L-LTF, 416 for the L-SIG field, 416 for the VHT-SIG-A1 field or symbol, 416 for the VHT-SIG-A2 field or symbol, 48 for the VHT-STF, 484 for one or more VHT-LTFs, 484 for the VHT-SIG-B field or symbol and/or 484 for the DATA field.

In some configurations, the bandwidth indication may also be provided to the pilot generator 830. The pilot generator 830 may use the bandwidth indication to generate an appropriate number of pilot symbols. For example, the pilot generator 830 may generate eight pilot symbols for an 80 MHz signal (with 242 OFDM tones: 234 data tones and eight pilot tones with three DC subcarriers 840).

In some configurations, the bandwidth indication may additionally be provided to the pilot insertion block/module 812. The pilot insertion block/module 812 may use this indication to determine subcarrier indices for pilot symbol insertion. For instance, an 80 MHz bandwidth may indicate that the pilot symbols should be inserted at indices −103, −75, −39, −11, 11, 39, 75 and 103.

The data and/or pilot signals are provided to an inverse fast Fourier transform (IFFT) block/module 820. The inverse fast Fourier transform (IFFT) block/module 820 converts the frequency signals of the data 804, 816 and inserted pilot tones into time domain signals representing the signal over the spatial streams 838 and/or time-domain samples for a symbol period. In one configuration, for example, the IFFT block/module 820 may perform a 256-point inverse fast Fourier transform (IFFT).

The time-domain signal is provided to a formatter 822. The formatter (e.g., one or more formatting blocks/modules) 822 may take the output of the inverse fast Fourier transform (IFFT) block/module 820, convert it from parallel signals to serial (P/S), add a cyclical prefix and/or perform guard interval windowing, etc.

The formatter 822 output may be provided to a digital-to-analog converter (DAC) 824. The digital-to-analog converter (DAC) 824 may convert the formatter 822 output from one or more digital signals to one or more analog signals. The digital-to-analog converter (DAC) 824 may provide the analog signal(s) to one or more transmitter radio-frequency (TX RF) blocks 826.

The one or more transmitter radio frequency blocks 826 may be coupled to or include a power amplifier. The power amplifier may amplify the analog signal(s) for transmission. The one or more transmitter radio frequency blocks 826 may output radio-frequency (RF) signals to one or more antennas 832*a-n*, thereby transmitting the data 804, 816 that was input to the encoder 806 over a wireless medium suitably configured for receipt by one or more access terminals 842.

One or more access terminals 842 may receive and use signals from the access point 802. For example, an access terminal 842 may use a received bandwidth indicator to receive a given number of OFDM tones or subcarriers 840. Additionally or alternatively, an access terminal 842 may use a pilot sequence generated by the access point 802 to characterize the channel, transmitter impairments and/or receiver impairments and use that characterization to improve receipt of data 804, 816 encoded in the transmissions.

For example, an access terminal 842 may include one or more antennas 836*a-n* (which may be greater than, less than or equal to the number of access point 802 antennas 832*a-n* and/or the number of spatial streams 838) that feed to one or more receiver radio-frequency (RX RF) blocks 858. The one or more receiver radio-frequency (RX RF) blocks 858 may output analog signals to one or more analog-to-digital converters (ADCs) 856. For example, a receiver radio-frequency block 858 may receive and downconvert a signal, which may be provided to an analog-to-digital converter 856. As with the access point 802, the number of spatial streams 838 processed may or may not be equal to the number of antennas 836*a-n*. Furthermore, each spatial stream 838 need not be limited to one antenna 836, as various beamsteering, orthogonalization, etc. techniques may be used to arrive at a plurality of receiver streams.

The one or more analog-to-digital converters (ADCs) 856 may convert the received analog signal(s) to one or more digital signal(s). These output(s) of the one or more analog-to-digital converters (ADCs) 856 may be provided to one or more time and/or frequency synchronization blocks/modules 854. A time and/or frequency synchronization block/module 854 may (attempt to) synchronize or align the digital signal in time and/or frequency (to an access terminal 842 clock, for example).

The (synchronized) output of the time and/or frequency synchronization block(s)/module(s) 854 may be provided to one or more deformatters 852. For example, a deformatter 852 may receive an output of the time and/or frequency synchronization block(s)/module(s) 854, remove prefixes, etc. and/or parallelize the data for fast Fourier transform (FFT) processing.

One or more deformatter 852 outputs may be provided to one or more fast Fourier transform (FFT) blocks/modules 850. The fast Fourier transform (FFT) blocks/modules 850 may convert one or more signals from the time domain to the frequency domain. A pilot processor 848 may use the frequency domain signals (per spatial stream 838, for example) to determine one or more pilot tones (over the spatial streams 838, frequency subcarriers 840 and/or groups of symbol periods, for example) sent by the access point 802. The pilot processor 848 may additionally or alternatively de-scramble the pilot sequence. The pilot processor 848 may use the one or more pilot sequences described herein for phase and/or frequency and/or amplitude tracking. The pilot tone(s) may be provided to a space-time-frequency detection and/or decoding block/module 846, which may detect and/or decode the data over the various dimensions. The space-time-frequency detection and/or decoding block/module 846 may output received data 844 (e.g., the access terminal's 842 estimation of the payload data 804 and/or preamble data 816 transmitted by the access point 802).

In some configurations, the access terminal 842 knows the transmit sequences sent as part of a total information sequence. The access terminal 842 may perform channel estimation with the aid of these known transmit sequences. To assist with pilot tone tracking, processing and/or data detection and decoding, a channel estimation block/module 860 may provide estimation signals to the pilot processor 848 and/or the space-time-frequency detection and/or decoding block/module 846 based on the output from the time and/or frequency synchronization block/module 854. Alternatively, if the de-formatting and fast Fourier transform is the same for the known transmit sequences as for the payload data portion of the total information sequence, the estimation signals may be provided to the pilot processor 848 and/or the space-time-frequency detection and/or decoding block/module 846 based on the output from the fast Fourier transform (FFT) blocks/modules 850.

The bandwidth determination block/module 834 may use the time/frequency synchronization block/module output to determine a channel bandwidth (for received communications). For example, the bandwidth determination block/module 834 may receive a bandwidth indication from the access point 802 that indicates a channel bandwidth. For instance, the bandwidth determination block/module 834 may obtain an explicit or implicit bandwidth indication. In one configuration, the bandwidth indication may indicate a channel bandwidth of 20 MHz, 40 MHz, 80 MHz or 160 MHz. The bandwidth determination block/module 834 may determine the bandwidth for received communications based on this indication and provide an indication of the determined bandwidth to the pilot processor 848 and/or to the space-time-frequency detection/decoding block/module 846.

More specifically, if the determined bandwidth is 20 MHz, the access terminal 842 may receive 12 OFDM tones for the L-STF, 52 for the L-LTF, 52 for the L-SIG field, 52 for the VHT-SIG-A1 field or symbol, 52 for the VHT-SIG-A2 field or symbol, 12 for the VHT-STF, 56 for one or more VHT-LTFs, 56 for the VHT-SIG-B field and/or 56 for the DATA field. If the bandwidth determined is 40 MHz, the access terminal 842 may receive 24 OFDM tones for the L-STF, 104 for the L-LTF, 104 for the L-SIG field, 104 for the VHT-SIG-A1 field or symbol, 104 for the VHT-SIG-A2 field or symbol, 24 for the VHT-STF, 114 for one or more VHT-LTFs, 114 for the VHT-SIG-B field and/or 114 for the DATA field. If the bandwidth is 80 MHz, the access terminal 842 may receive 48 OFDM tones for the L-STF, 208 for the L-LTF, 208 for the L-SIG field, 208 for the VHT-SIG-A1 field or symbol, 208 for the VHT-SIG-A2 field or symbol, 48 for the VHT-STF, 242 for one or more VHT-LTFs, 242 for the VHT-SIG-B field and/or 242 for the DATA field. If the bandwidth is 160 MHz, the access terminal 842 may receive 48 OFDM tones for the L-STF, 416 for the L-LTF, 416 for the L-SIG field, 416 for the VHT-SIG-A1 field or symbol, 416 for the VHT-SIG-A2 field or symbol, 48 for the VHT-STF, 484 for one or more VHT-LTFs, 484 for the VHT-SIG-B field or symbol and/or 484 for the DATA field.

The pilot processor 848 may use the determined bandwidth indication to extract pilot symbols from the fast Fourier transform block/module 850 output. For example, if the determined bandwidth indication specifies an 80 MHz bandwidth 863, the pilot processor 848 may extract pilot symbols from the indices −103, −75, −39, −11, 11, 39, 75 and 103.

The space-time frequency detection/decoding block/module 846 may use the determined bandwidth indication to detect and/or decode preamble data from the received signal. For example, if the current field is a VHT-SIG-B field and the determined bandwidth indication specifies that the bandwidth is 80 MHz, then the space-time frequency detection/decoding block/module 846 may detect and/or decode preamble data from 234 OFDM tones or subcarriers 840 (while eight OFDM tones are pilot tones and three subcarriers 840 are used for DC tones, for instance). In some configurations, the space-time-frequency detection/decoding block/module 846 may use a look-up table to determine the number of tones or subcarriers to receive for a specified bandwidth.

In one configuration, an access terminal 842 may also transmit data 857 (e.g., preamble data and/or payload data) to the access point 802. For example, an access terminal 842 may include a transmitter 859. The transmitter 859 may include a transmission bandwidth determination block/module 861 (illustrated as "Transmission Bandwidth" in FIG. 8 for convenience). The transmission bandwidth determination block/module 861 may determine a communication bandwidth for a transmission to the access point 802. For instance, the transmitter 859 may perform the same or similar operations for allocating tones for a frame as performed by the access point 802. Thus, for example, the transmitter 859 may obtain data 857, determine a bandwidth, allocate tones for a frame based on the bandwidth (and a frame field or signal), map data and pilots to the tones and/or transmit the resulting signal similar to the access point 802.

In some configurations, the access point 802 may include a receiver 853 for receiving data and/or pilot symbols. For example, the access point 802 may receive a bandwidth indication, data and/or a pilot symbols from the access terminal 842. The receiver 853 may include a reception bandwidth determination block/module 855 (illustrated as "Reception Bandwidth" in FIG. 8 for convenience). The reception bandwidth determination block/module 855 may determine a reception bandwidth in a similar manner as the bandwidth determination block/module 834 included in the access terminal 842. For instance, the access point 802 may receive a bandwidth indication or message from the access terminal 842, which it 802 may use to determine a reception bandwidth. The access point 802 may use this reception bandwidth determination to detect, decode, demodulate, etc. one or more signals received from the access terminal 842. For instance, the receiver 853 may similarly perform one or more operations performed by the access terminal 842. In other words, the receiver 853 may similarly perform one or more operations to receive tones for a frame (e.g., received data 851) that are performed by the access terminal 842 to obtain its received data 844.

Figure 9:
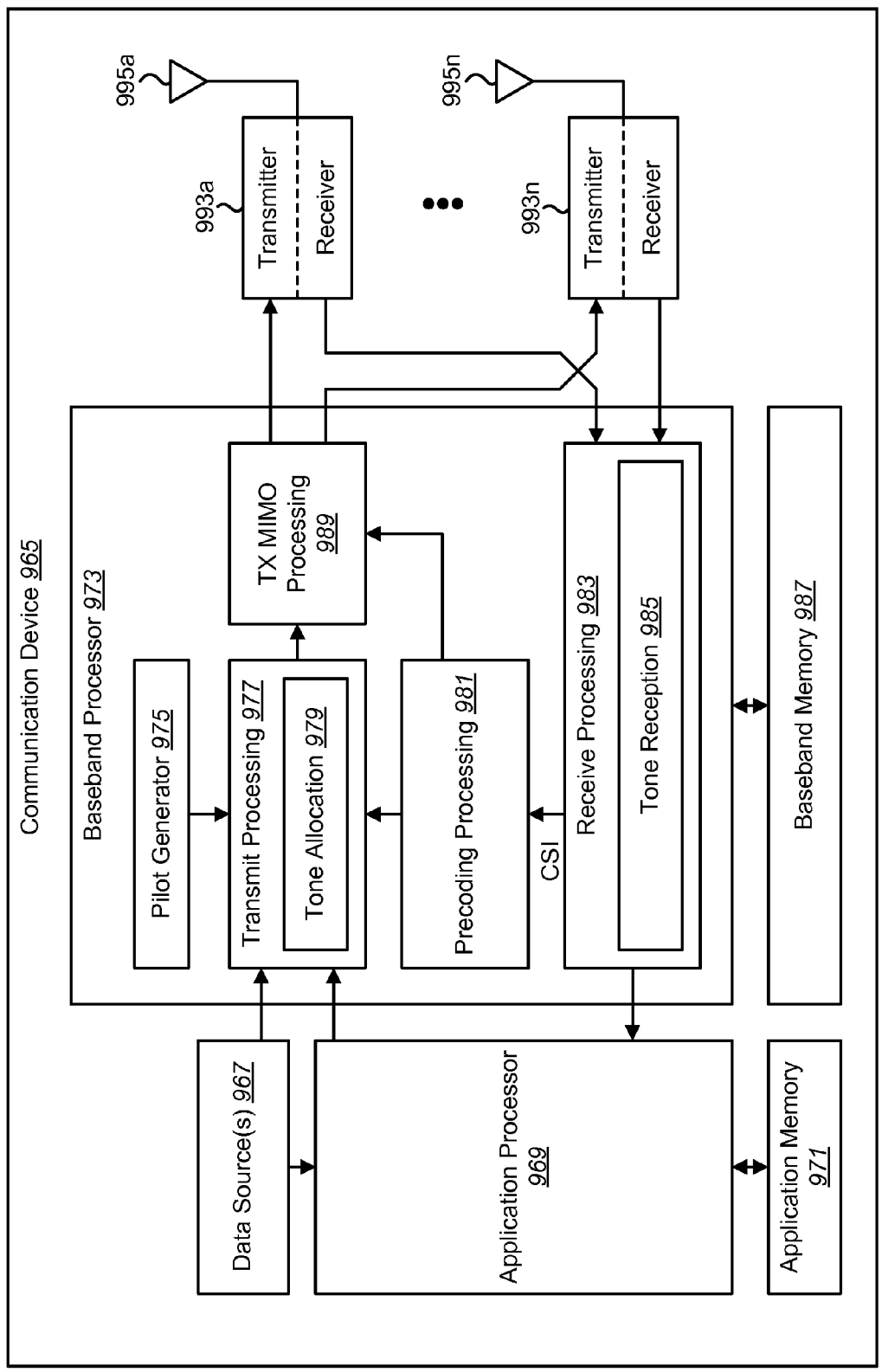
FIG. 9 is a block diagram of a communication device that may be used in a multiple-input and multiple-output (MIMO) system.

FIG. 9 is a block diagram of a communication device 965 that may be used in a multiple-input and multiple-output (MIMO) system. Examples of the communication device 965 may include transmitting communication devices 102, receiving communication devices 142, access points 802, access terminals 842, base stations, user equipment (UEs), etc. In the communication device 965, traffic data for a number of data streams is provided from one or more data sources 967 and/or an application processor 969 to a baseband processor 973. In particular, traffic data may be provided to a transmit processing block/module 977 included in the baseband processor 973. Each data stream may then be transmitted over a respective transmit antenna 995*a-n*. The transmit processing block/module 977 may format, code and interleave the traffic data for each data stream based on a particular coding scheme selected for that data stream to provide coded data.

The transmit processing block/module 977 may perform the method 600 illustrated in FIG. 6. For example, the transmit processing block/module 977 may include a tone allocation block/module 979. The tone allocation block/module 979 may execute instructions in order to allocate tones for a frame.

The coded data for each data stream may be multiplexed with pilot data from a pilot generator 975 using orthogonal frequency-division multiplexing (OFDM) techniques. The pilot data may be a known data pattern that is processed in a known manner and used at a receiver to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK), quadrature amplitude modulation (QAM) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processing block/module 989, which may further process the modulation symbols (e.g., for OFDM). The transmit (TX) multiple-input multiple-output (MIMO) processing block/module 989 then provides a number of modulation symbol streams to the transmitters 993*a-n*. The TX transmit (TX) multiple-input multiple-output (MIMO) processing block/module 989 may apply beamforming weights to the symbols of the data streams and to the antenna 995 from which the symbol is being transmitted.

Each transmitter 993 may receive and process a respective symbol stream to provide one or more analog signals, and further condition (e.g., amplify, filter, and upconvert) the analog signals to provide a modulated signal suitable for transmission over the MIMO channel. Modulated signals from the transmitters 993*a-n* are then respectively transmitted from the antennas 995*a-n*. For example, the modulated signal may be transmitted to another communication device (not illustrated in FIG. 9).

The communication device 965 may receive modulated signals (from another communication device). These modulated signals are received by antennas 995 and conditioned by receivers 993 (e.g., filtered, amplified, downconverted, digitized). In other words, each receiver 993 may condition (e.g., filter, amplify, and downconvert) a respective received signal, digitize the conditioned signal to provide samples, and further process the samples to provide a corresponding "received" symbol stream.

A receive processing block/module 983 included in the baseband processor 973 then receives and processes the received symbol streams from the receivers 993 based on a particular receiver processing technique to provide a number of "detected" streams. The receive processing block/module 983 demodulates, deinterleaves and decodes each stream to recover the traffic data for the data stream.

The receive processing block/module 983 may perform the method 700 illustrated in FIG. 7. For example, the receive processing block/module 983 may include a tone reception block/module 985. The tone reception block/module 985 may execute instructions to receive tones for a frame.

A precoding processing block/module 981 included in the baseband processor 973 may receive channel state information (CSI) from the receive processing block/module 983. The precoding processing block/module 981 then determines which pre-coding matrix to use for determining the beamforming weights and then processes the extracted message. It should be noted that the baseband processor 973 may store information on and retrieve information from baseband memory 987.

The traffic data recovered by the baseband processor 973 may be provided to the application processor 969. The application processor 969 may store information in and retrieve information from the application memory 971.

Figure 10:
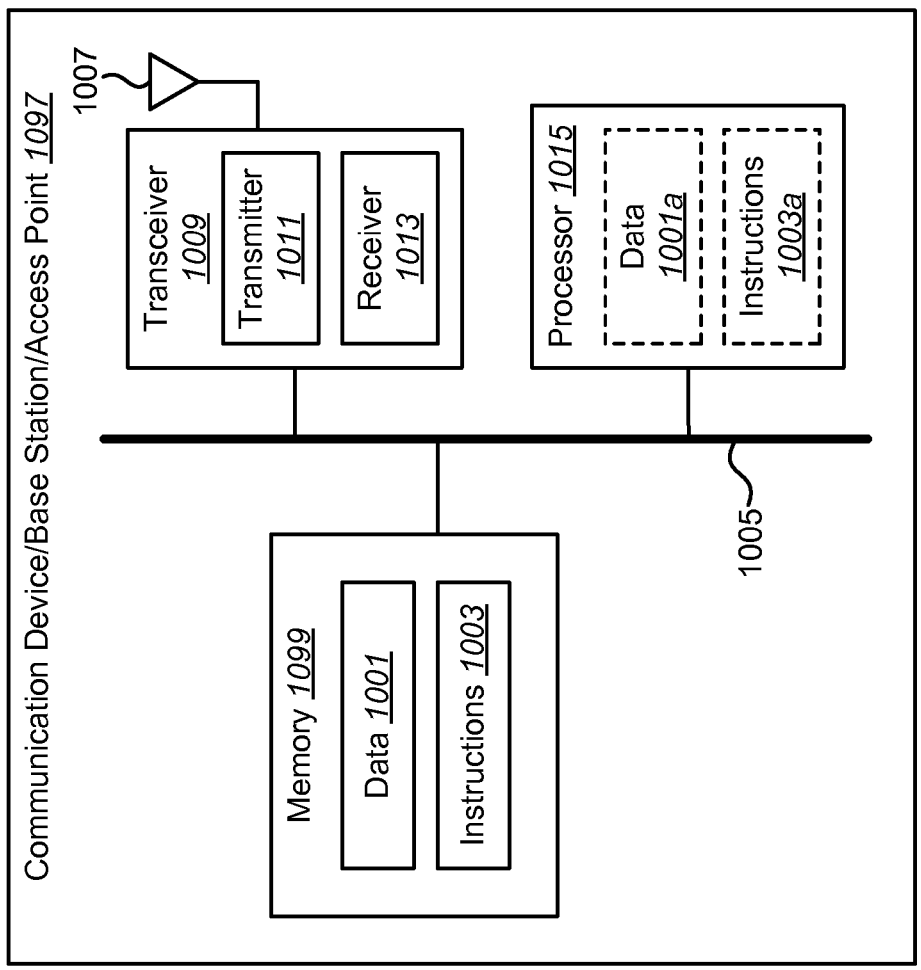
FIG. 10 illustrates certain components that may be included within a communication device, base station and/or access point.

FIG. 10 illustrates certain components that may be included within a communication device, base station and/or access point 1097. The transmitting communication device 102, receiving communication device 142, access point 802 and/or communication device 965 described above may be configured similarly to the communication device/base station/access point 1097 that is shown in FIG. 10.

The communication device/base station/access point 1097 includes a processor 1015. The processor 1015 may be a general purpose single- or multi-chip microprocessor (e.g., an ARM), a special purpose microprocessor (e.g., a digital signal processor (DSP)), a microcontroller, a programmable gate array, etc. The processor 1015 may be referred to as a central processing unit (CPU). Although just a single processor 1015 is shown in the communication device/base station/access point 1097 of FIG. 10, in an alternative configuration, a combination of processors (e.g., an ARM and DSP) could be used.

The communication device/base station/access point 1097 also includes memory 1099 in electronic communication with the processor 1015 (i.e., the processor 1015 can read information from and/or write information to the memory 1099). The memory 1099 may be any electronic component capable of storing electronic information. The memory 1099 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 1001 and instructions 1003 may be stored in the memory 1099. The instructions 1003 may include one or more programs, routines, sub-routines, functions, procedures, code, etc. The instructions 1003 may include a single computer-readable statement or many computer-readable statements. The instructions 1003 may be executable by the processor 1015 to implement the methods 600, 700 described above. Executing the instructions 1003 may involve the use of the data 1001 that is stored in the memory 1099. FIG. 10 shows some instructions 1003*a* and data 1001*a* being loaded into the processor 1015.

The communication device/base station/access point 1097 may also include a transmitter 1011 and a receiver 1013 to allow transmission and reception of signals between the communication device/base station/access point 1097 and a remote location (e.g., another communication device, access terminal, access point, etc.). The transmitter 1011 and receiver 1013 may be collectively referred to as a transceiver 1009. An antenna 1007 may be electrically coupled to the transceiver 1009. The communication device/base station/access point 1097 may also include (not shown) multiple transmitters, multiple receivers, multiple transceivers and/or multiple antenna.

The various components of the communication device/base station/access point 1097 may be coupled together by one or more buses, which may include a power bus, a control signal bus, a status signal bus, a data bus, etc. For simplicity, the various buses are illustrated in FIG. 10 as a bus system 1005.

Figure 11:
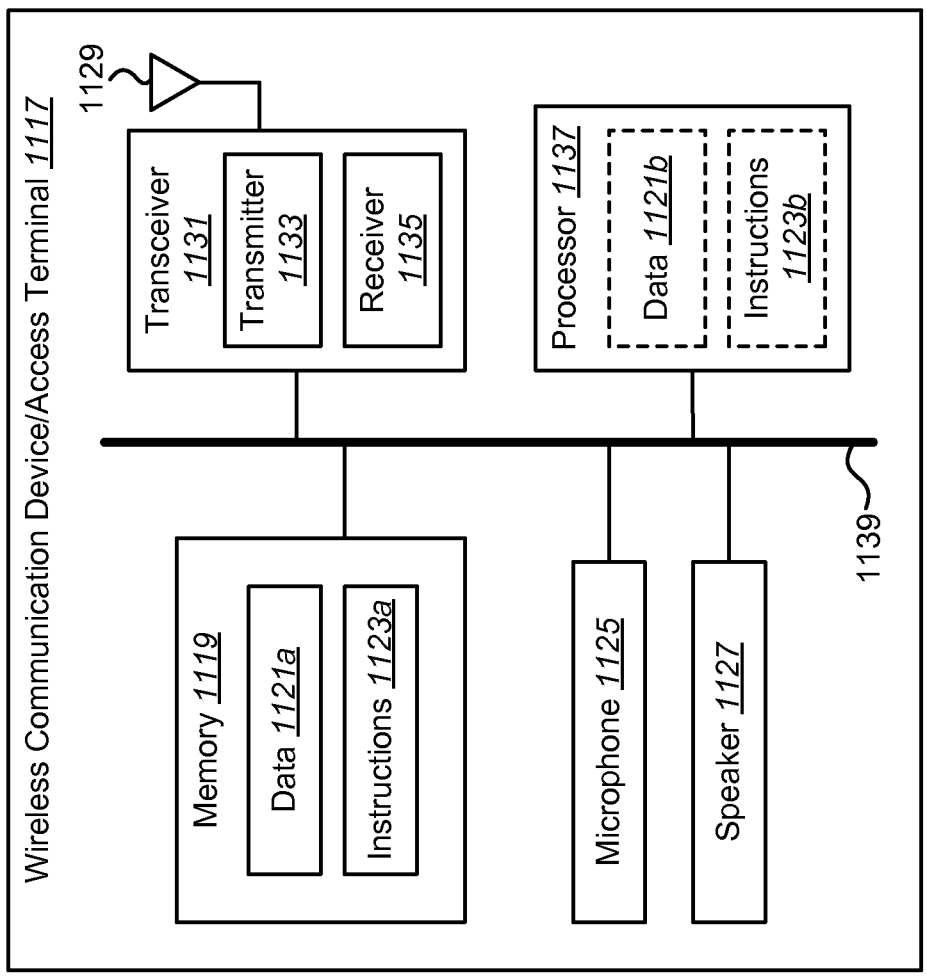
FIG. 11 illustrates certain components that may be included within a wireless communication device and/or access terminal.

FIG. 11 illustrates certain components that may be included within a wireless communication device and/or access terminal 1117. One or more of the transmitting communication device 102, receiving communication device 142, access terminal 842 and communication device 965 described above may be configured similarly to the wireless communication device/access terminal 1117 that is shown in FIG. 11.

The wireless communication device/access terminal 1117 includes a processor 1137. The processor 1137 may be a general purpose single- or multi-chip microprocessor (e.g., an ARM), a special purpose microprocessor (e.g., a digital signal processor (DSP)), a microcontroller, a programmable gate array, etc. The processor 1137 may be referred to as a central processing unit (CPU). Although just a single processor 1137 is shown in the wireless communication device/access terminal 1117 of FIG. 11, in an alternative configuration, a combination of processors 1137 (e.g., an ARM and DSP) could be used.

The wireless communication device/access terminal 1117 also includes memory 1119 in electronic communication with the processor 1137 (i.e., the processor 1137 can read information from and/or write information to the memory 1119). The memory 1119 may be any electronic component capable of storing electronic information. The memory 1119 may be random access memory (RAM), read-only memory (ROM), magnetic disk storage media, optical storage media, flash memory devices in RAM, on-board memory included with the processor 1137, programmable read-only memory (PROM), erasable programmable read-only memory (EPROM), electrically erasable PROM (EEPROM), registers, and so forth, including combinations thereof.

Data 1121a and instructions 1123a may be stored in the memory 1119. The instructions 1123a may include one or more programs, routines, sub-routines, functions, procedures, code, etc. The instructions 1123a may include a single computer-readable statement or many computer-readable statements. The instructions 1123a may be executable by the processor 1137 to implement one or more of the methods 600, 700 described above. Executing the instructions 1123a may involve the use of the data 1121a that is stored in the memory 1119. FIG. 11 shows some instructions 1123b and data 1121b being loaded into the processor 1137 (which may come from instructions 1123a and data 1121a in memory 1119).

The wireless communication device/access terminal 1117 may also include a transmitter 1133 and a receiver 1135 to allow transmission and reception of signals between the wireless communication device/access terminal 1117 and a remote location (e.g., another electronic device, wireless communication device, etc.). The transmitter 1133 and receiver 1135 may be collectively referred to as a transceiver 1131. An antenna 1129 may be electrically coupled to the transceiver 1131. The wireless communication device/access terminal 1117 may also include (not shown) multiple transmitters 1133, multiple receivers 1135, multiple transceivers 1131 and/or multiple antenna 1129.

In some configurations, the wireless communication device/access terminal 1117 may include one or more microphones 1125 for capturing acoustic signals. In one configuration, a microphone 1125 may be a transducer that converts acoustic signals (e.g., voice, speech) into electrical or electronic signals. Additionally or alternatively, the wireless communication device/access terminal 1117 may include one or more speakers 1127. In one configuration, a speaker 1127 may be a transducer that converts electrical or electronic signals into acoustic signals.

The various components of the wireless communication device/access terminal 1117 may be coupled together by one or more buses, which may include a power bus, a control signal bus, a status signal bus, a data bus, etc. For simplicity, the various buses are illustrated in FIG. 11 as a bus system 1139.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communication device for allocating orthogonal frequency division multiplexing (OFDM) tones, comprising:
    a processor;
    memory in electronic communication with the processor;
    instructions stored in the memory, the instructions being executable to:
        allocate 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if a bandwidth for signal transmission is 20 megahertz (MHz);
        allocate 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz;
        allocate 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz;
        allocate 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz; and
        transmit a signal using the allocated tones.

2. The communication device of claim 1, wherein the instructions are further executable to:
    allocate 12 tones for a non-high throughput (non-HT) short training field (L-STF), 52 tones for a non-HT long training field (L-LTF) and 52 tones for a non-HT signal field (L-SIG) if the bandwidth is 20 MHz;
    allocate 24 tones for the L-STF, 104 tones for the L-LTF and 104 tones for the L-SIG if the bandwidth is 40 MHz;
    allocate 48 tones for the L-STF, 208 tones for the L-LTF and 208 tones for the L-SIG if the bandwidth is 80 MHz; and
    allocate 48 tones for the L-STF, 416 tones for the L-LTF and 416 tones for the L-SIG if the bandwidth is 160 MHz.

3. The communication device of claim 1, wherein
    if the bandwidth is 20 MHz, the allocated 56 tones for the VHT-SIG-B comprise 52 data tones for the 20 MHz of bandwidth, wherein 52 data tones carries 26 bits using 1/2 rate coding,
    if the bandwidth is 40 MHz, the allocated 114 tones for the VHT-SIG-B comprise 108 data tones for the 40 MHz of bandwidth or 54 data tones per 20 MHz of bandwidth, wherein 54 data tones carries 27 bits using 1/2 rate coding,
    if the bandwidth is 80 MHz, the allocated 242 tones for the VHT-SIG-B comprise 234 data tones for the 80 MHz of bandwidth, 117 data tones per 40 MHz of bandwidth, or 58.5 data tones per 20 MHz of bandwidth, wherein 58.5 data tones carries 29 bits using 1/2 rate coding, and
    if the bandwidth is 160 MHz, the allocated 484 tones for the VHT-SIG-B comprise 468 data tones for the 160 MHz of bandwidth, 234 data tones per 80 MHz of bandwidth, 117 data tones per 40 MHz of bandwidth, or 58.5 data tones per 20 MHz of bandwidth, wherein 58.5 data tones carries 29 bits using 1/2 rate coding.

4. The communication device of claim 1, wherein the VHT-SIG-B carries one or more pad bits if the bandwidth is 80 MHz or 160 MHz.

5. The communication device of claim 1, wherein the instructions are further executable to generate a bandwidth message based on the bandwidth.

6. The communication device of claim 1, wherein the instructions are further executable to modulate the VHT-SIG-A2 using quadrature binary phase-shift keying (QBPSK) to indicate that a frame includes a very high throughput (VHT) signal.

7. The communication device of claim 1, wherein the instructions are further executable to insert pilot tones at subcarrier indices −103, −75, −39, −11, 11, 39, 75 and 103 if the bandwidth is 80 MHz.

8. A communication device for receiving orthogonal frequency division multiplexing (OFDM) tones, comprising:
    a processor;
    memory in electronic communication with the processor;
    instructions stored in the memory, the instructions being executable to:
        receive 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if a bandwidth for signal reception is 20 megahertz (MHz);
        receive 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz;
        receive 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz; and
        receive 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz.

9. The communication device of claim 8, wherein the instructions are further executable to:
   receive 12 tones for a non-high throughput (non-HT) short training field (L-STF), 52 tones for a non-HT long training field (L-LTF) and 52 tones for a non-HT signal field (L-SIG) if the bandwidth is 20 MHz;
   receive 24 tones for the L-STF, 104 tones for the L-LTF and 104 tones for the L-SIG if the bandwidth is 40 MHz;
   receive 48 tones for the L-STF, 208 tones for the L-LTF and 208 tones for the L-SIG if the bandwidth is 80 MHz; and
   receive 48 tones for the L-STF, 416 tones for the L-LTF and 416 tones for the L-SIG if the bandwidth is 160 MHz.

10. The communication device of claim 8, wherein
   if the bandwidth is 20 MHz, the received 56 tones for the VHT-SIG-B comprise 52 data tones for the 20 MHz of bandwidth, wherein 52 data tones carries 26 bits using 1/2 rate coding,
   if the bandwidth is 40 MHz, the received 114 tones for the VHT-SIG-B comprise 108 data tones for the 40 MHz of bandwidth or 54 data tones per 20 MHz of bandwidth, wherein 54 data tones carries 27 bits using 1/2 rate coding,
   if the bandwidth is 80 MHz, the received 242 tones for the VHT-SIG-B comprise 234 data tones for the 80 MHz of bandwidth, 117 data tones per 40 MHz of bandwidth, or 58.5 data tones per 20 MHz of bandwidth, wherein 58.5 data tones carries 29 bits using 1/2 rate coding, and
   if the bandwidth is 160 MHz, the received 484 tones for the VHT-SIG-B comprise 468 data tones for the 160 MHz of bandwidth, 234 data tones per 80 MHz of bandwidth, 117 data tones per 40 MHz of bandwidth, or 58.5 data tones per 20 MHz of bandwidth, wherein 58.5 data tones carries 29 bits using 1/2 rate coding.

11. The communication device of claim 8, wherein the VHT-SIG-B carries one or more pad bits if the bandwidth is 80 MHz or 160 MHz.

12. The communication device of claim 8, wherein determining whether the bandwidth for signal reception is 20 MHz, 40 MHz, 80 MHz or 160 MHz comprises receiving a bandwidth indication.

13. The communication device of claim 8, wherein the instructions are further executable to detect a very high throughput (VHT) signal if the VHT-SIG-A2 uses quadrature binary phase-shift keying (QBPSK).

14. The communication device of claim 8, wherein the instructions are further executable to receive pilot tones at subcarrier indices −103, −75, −39, −11, 11, 39, 75 and 103 if the bandwidth is 80 MHz.

15. A method for allocating orthogonal frequency division multiplexing (OFDM) tones on a communication device, comprising:
   allocating 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if a bandwidth for signal transmission is 20 megahertz (MHz);
   allocating 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz;
   allocating 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz;
   allocating 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz; and
   transmitting a signal using the allocated tones.

16. The method of claim 15, further comprising:
   allocating 12 tones for a non-high throughput (non-HT) short training field (L-STF), 52 tones for a non-HT long training field (L-LTF) and 52 tones for a non-HT signal field (L-SIG) if the bandwidth is 20 MHz;
   allocating 24 tones for the L-STF, 104 tones for the L-LTF and 104 tones for the L-SIG if the bandwidth is 40 MHz;
   allocating 48 tones for the L-STF, 208 tones for the L-LTF and 208 tones for the L-SIG if the bandwidth is 80 MHz; and
   allocating 48 tones for the L-STF, 416 tones for the L-LTF and 416 tones for the L-SIG if the bandwidth is 160 MHz.

17. The method of claim 15, wherein
   if the bandwidth is 20 MHz, the allocated 56 tones for the VHT-SIG-B comprise 52 data tones for the 20 MHz of bandwidth, wherein 52 data tones carries 26 bits using 1/2 rate coding,
   if the bandwidth is 40 MHz, the allocated 114 tones for the VHT-SIG-B comprise 108 data tones for the 40 MHz of bandwidth or 54 data tones per 20 MHz of bandwidth, wherein 54 data tones carries 27 bits using 1/2 rate coding,
   if the bandwidth is 80 MHz, the allocated 242 tones for the VHT-SIG-B comprise 234 data tones for the 80 MHz of bandwidth, 117 data tones per 40 MHz of bandwidth, or 58.5 data tones per 20 MHz of bandwidth, wherein 58.5 data tones carries 29 bits using 1/2 rate coding, and
   if the bandwidth is 160 MHz, the allocated 484 tones for the VHT-SIG-B comprise 468 data tones for the 160 MHz of bandwidth, 234 data tones per 80 MHz of bandwidth, 117 data tones per 40 MHz of bandwidth, or 58.5 data tones per 20 MHz of bandwidth, wherein 58.5 data tones carries 29 bits using 1/2 rate coding.

18. The method of claim 15, wherein the VHT-SIG-B carries one or more pad bits if the bandwidth is 80 MHz or 160 MHz.

19. The method of claim 15, further comprising generating a bandwidth message based on the bandwidth.

20. The method of claim 15, further comprising modulating the VHT-SIG-A2 using quadrature binary phase-shift keying (QBPSK) to indicate that a frame includes a very high throughput (VHT) signal.

21. The method of claim 15, further comprising inserting pilot tones at subcarrier indices 103, −75, −39, −11, 11, 39, 75 and 103 if the bandwidth is 80 MHz.

22. A method for receiving orthogonal frequency division multiplexing (OFDM) tones on a communication device, comprising:
   receiving 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if a bandwidth for signal reception is 20 megahertz (MHz);

receiving 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz;

receiving 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz; and receiving 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz.

23. The method of claim 22, further comprising:
receiving 12 tones for a non-high throughput (non-HT) short training field (L-STF), 52 tones for a non-HT long training field (L-LTF) and 52 tones for a non-HT signal field (L-SIG) if the bandwidth is 20 MHz;
receiving 24 tones for the L-STF, 104 tones for the L-LTF and 104 tones for the L-SIG if the bandwidth is 40 MHz;
receiving 48 tones for the L-STF, 208 tones for the L-LTF and 208 tones for the L-SIG if the bandwidth is 80 MHz; and
receiving 48 tones for the L-STF, 416 tones for the L-LTF and 416 tones for the L-SIG if the bandwidth is 160 MHz.

24. The method of claim 22, wherein
if the bandwidth is 20 MHz, the received 56 tones for the VHT-SIG-B comprise 52 data tones for the 20 MHz of bandwidth, wherein 52 data tones carries 26 bits using 1/2 rate coding,
if the bandwidth is 40 MHz, the received 114 tones for the VHT-SIG-B comprise 108 data tones for the 40 MHz of bandwidth or 54 data tones per 20 MHz of bandwidth, wherein 54 data tones carries 27 bits using 1/2 rate coding,
if the bandwidth is 80 MHz, the received 242 tones for the VHT-SIG-B comprise 234 data tones for the 80 MHz of bandwidth, 117 data tones per 40 MHz of bandwidth, or 58.5 data tones per 20 MHz of bandwidth, wherein 58.5 data tones carries 29 bits using 1/2 rate coding, and
if the bandwidth is 160 MHz, the received 484 tones for the VHT-SIG-B comprise 468 data tones for the 160 MHz of bandwidth, 234 data tones per 80 MHz of bandwidth, 117 data tones per 40 MHz of bandwidth, or 58.5 data tones per 20 MHz of bandwidth, wherein 58.5 data tones carries 29 bits using 1/2 rate coding.

25. The method of claim 22, wherein the VHT-SIG-B carries one or more pad bits if the bandwidth is 80 MHz or 160 MHz.

26. The method of claim 22, wherein determining whether the bandwidth for signal reception is 20 MHz, 40 MHz, 80 MHz or 160 MHz comprises receiving a bandwidth indication.

27. The method of claim 22, further comprising detecting a very high throughput (VHT) signal if the VHT-SIG-A2 uses quadrature binary phase-shift keying (QBPSK).

28. The method of claim 22, further comprising receiving pilot tones at subcarrier indices 103, −75, −39, −11, 11, 39, 75 and 103 if the bandwidth is 80 MHz.

29. A computer-program product for allocating orthogonal frequency division multiplexing (OFDM) tones, comprising a non-transitory tangible computer-readable medium having instructions thereon, the instructions comprising:

code for causing the communication device to allocate 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if a bandwidth for signal transmission is 20 megahertz (MHz);

code for causing the communication device to allocate 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz;

code for causing the communication device to allocate 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz;

code for causing the communication device to allocate 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz; and code for causing the communication device to transmit a signal using the allocated tones.

30. The computer-program product of claim 29, wherein
if the bandwidth is 20 MHz, the allocated 56 tones for the VHT-SIG-B comprise 52 data tones for the 20 MHz of bandwidth, wherein 52 data tones carries 26 bits using 1/2 rate coding,
if the bandwidth is 40 MHz, the allocated 114 tones for the VHT-SIG-B comprise 108 data tones for the 40 MHz of bandwidth or 54 data tones per 20 MHz of bandwidth, wherein 54 data tones carries 27 bits using 1/2 rate coding,
if the bandwidth is 80 MHz, the allocated 242 tones for the VHT-SIG-B comprise 234 data tones for the 80 MHz of bandwidth, 117 data tones per 40 MHz of bandwidth, or 58.5 data tones per 20 MHz of bandwidth, wherein 58.5 data tones carries 29 bits using 1/2 rate coding, and
if the bandwidth is 160 MHz, the allocated 484 tones for the VHT-SIG-B comprise 468 data tones for the 160 MHz of bandwidth, 234 data tones per 80 MHz of bandwidth, 117 data tones per 40 MHz of bandwidth, or 58.5 data tones per 20 MHz of bandwidth, wherein 58.5 data tones carries 29 bits using 1/2 rate coding.

31. The computer-program product of claim 29, the instructions further comprising code for causing the communication device to generate a bandwidth message based on the bandwidth.

32. The computer-program product of claim 29, the instructions further comprising code for causing the communication device to modulate the VHT-SIG-A2 using quadrature binary phase-shift keying (QBPSK) to indicate that a frame includes a very high throughput (VHT) signal.

33. A computer-program product for receiving orthogonal frequency division multiplexing (OFDM) tones, comprising a non-transitory tangible computer-readable medium having instructions thereon, the instructions comprising:
code for causing the communication device to receive 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT- SIG-B) and 56 tones for a data field (DATA) if a bandwidth for signal reception is 20 megahertz (MHz);

code for causing the communication device to receive 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz;

code for causing the communication device to receive 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz; and code for causing the communication device to receive 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz.

34. The computer-program product of claim 33, wherein
if the bandwidth is 20 MHz, the received 56 tones for the VHT-SIG-B comprise 52 data tones for the 20 MHz of bandwidth, wherein 52 data tones carries 26 bits using 1/2 rate coding,
if the bandwidth is 40 MHz, the received 114 tones for the VHT-SIG-B comprise 108 data tones for the 40 MHz of bandwidth or 54 data tones per 20 MHz of bandwidth, wherein 54 data tones carries 27 bits using 1/2 rate coding,
if the bandwidth is 80 MHz, the received 242 tones for the VHT-SIG-B comprise 234 data tones for the 80 MHz of bandwidth, 117 data tones per 40 MHz of bandwidth, or 58.5 data tones per 20 MHz of bandwidth, wherein 58.5 data tones carries 29 bits using 1/2 rate coding, and
if the bandwidth is 160 MHz, the received 484 tones for the VHT-SIG-B comprise 468 data tones for the 160 MHz of bandwidth, 234 data tones per 80 MHz of bandwidth, 117 data tones per 40 MHz of bandwidth, or 58.5 data tones per 20 MHz of bandwidth, wherein 58.5 data tones carries 29 bits using 1/2 rate coding.

35. The computer-program product of claim 33, wherein determining whether the bandwidth for signal reception is 20 MHz, 40 MHz, 80 MHz or 160 MHz comprises receiving a bandwidth indication.

36. The computer-program product of claim 33, wherein the instructions further comprise code for causing the communication device to detect a very high throughput (VHT) signal if the VHT-SIG-A2 uses quadrature binary phase-shift keying (QBPSK).

37. An apparatus for allocating orthogonal frequency division multiplexing (OFDM) tones, comprising:
means for allocating 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if the bandwidth is 20 MHz;
means for allocating 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz;
means for allocating 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz;
means for allocating 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz; and
means for transmitting a signal using the allocated tones.

38. The apparatus of claim 37, wherein
if the bandwidth is 20 MHz, the allocated 56 tones for the VHT-SIG-B comprise 52 data tones for the 20 MHz of bandwidth, wherein 52 data tones carries 26 bits using 1/2 rate coding,
if the bandwidth is 40 MHz, the allocated 114 tones for the VHT-SIG-B comprise 108 data tones for the 40 MHz of bandwidth or 54 data tones per 20 MHz of bandwidth, wherein 54 data tones carries 27 bits using 1/2 rate coding,
if the bandwidth is 80 MHz, the allocated 242 tones for the VHT-SIG-B comprise 234 data tones for the 80 MHz of bandwidth, 117 data tones per 40 MHz of bandwidth, or 58.5 data tones per 20 MHz of bandwidth, wherein 58.5 data tones carries 29 bits using 1/2 rate coding, and
if the bandwidth is 160 MHz, the allocated 484 tones for the VHT-SIG-B comprise 468 data tones for the 160 MHz of bandwidth, 234 data tones per 80 MHz of bandwidth, 117 data tones per 40 MHz of bandwidth, or 58.5 data tones per 20 MHz of bandwidth, wherein 58.5 data tones carries 29 bits using 1/2 rate coding.

39. The apparatus of claim 37, further comprising means for generating a bandwidth message based on the bandwidth.

40. The apparatus of claim 37, further comprising means for modulating the VHT-SIG-A2 using quadrature binary phase-shift keying (QBPSK) to indicate that a frame includes a very high throughput (VHT) signal.

41. An apparatus for receiving orthogonal frequency division multiplexing (OFDM) tones, comprising:
means for receiving 52 tones for a very high throughput signal field A1 (VHT-SIG-A1), 52 tones for a very high throughput signal field A2 (VHT-SIG-A2), 12 tones for a very high throughput short training field (VHT-STF), 56 tones for one or more very high throughput long training fields (VHT-LTFs), 56 tones for a very high throughput signal field B (VHT-SIG-B) and 56 tones for a data field (DATA) if a bandwidth for signal reception is 20 megahertz (MHz);
means for receiving 104 tones for the VHT-SIG-A1, 104 tones for the VHT-SIG-A2, 24 tones for the VHT-STF, 114 tones for the one or more VHT-LTFs, 114 tones for the VHT-SIG-B and 114 tones for the DATA if the bandwidth is 40 MHz;
means for receiving 208 tones for the VHT-SIG-A1, 208 tones for the VHT-SIG-A2, 48 tones for the VHT-STF, 242 tones for the one or more VHT-LTFs, 242 tones for the VHT-SIG-B and 242 tones for the DATA if the bandwidth is 80 MHz; and
means for receiving 416 tones for the VHT-SIG-A1, 416 tones for the VHT-SIG-A2, 48 tones for the VHT-STF, 484 tones for the one or more VHT-LTFs, 484 tones for the VHT-SIG-B and 484 tones for the DATA if the bandwidth is 160 MHz.

42. The apparatus of claim 41, wherein
if the bandwidth is 20 MHz, the received 56 tones for the VHT-SIG-B comprise 52 data tones for the 20 MHz of bandwidth, wherein 52 data tones carries 26 bits using 1/2 rate coding,
if the bandwidth is 40 MHz, the received 114 tones for the VHT-SIG-B comprise 108 data tones for the 40 MHz of bandwidth or 54 data tones per 20 MHz of bandwidth, wherein 54 data tones carries 27 bits using 1/2 rate coding, if the bandwidth is 80 MHz, the received 242 tones for the VHT-SIG-B comprise 234 data tones for the 80 MHz of bandwidth, 117 data tones per 40 MHz of bandwidth, or 58.5 data tones per 20 MHz of bandwidth, wherein 58.5 data tones carries 29 bits using 1/2 rate coding, and if the bandwidth is 160 MHz, the received 484 tones for the VHT-SIG-B comprise 468 data tones for the 160 MHz of bandwidth, 234 data tones per 80 MHz of bandwidth, 117 data tones per 40 MHz of bandwidth, or 58.5 data tones per 20 MHz of bandwidth, wherein 58.5 data tones carries 29 bits using 1/2 rate coding.

43. The apparatus of claim 41, wherein determining whether the bandwidth for signal reception is 20 MHz, 40 MHz, 80 MHz or 160 MHz comprises receiving a bandwidth indication.

44. The apparatus of claim 41, further comprising means for detecting a very high throughput (VHT) signal if the VHT-SIG-A2 uses quadrature binary phase-shift keying (QBPSK).

\* \* \* \* \*